3,431,285
SULFONATED 1-SEC-ALKYLAMINO-4-ARALKYL-
AMINO-ANTHRAQUINONES
Hans Rudolf Schwander, Riehen, Anton Zenhäusern,
Reinach, Basel-Land, and Peter Hindermann,
Bottmingen, Basel-Land, Switzerland, assignors to
J. R. Geigy A.G., Basel, Switzerland
No Drawing. Filed Dec. 17, 1965, Ser. No. 514,692
Claims priority, application Switzerland, Dec. 22, 1964,
16,533/64, 16,633/64
U.S. Cl. 260—371      3 Claims
Int. Cl. C09b *1/30;* D06p *3/24*

This invention relates in a first aspect to novel anthraquinone dyestuffs, their use in the dyeing and printing of textile fiber materials, especially of polyamide fiber materials, as well as to the materials colored with these dyestuffs.

In a second aspect, the invention relates to a novel process for the production of the aforesaid anthraquinone dyestuffs.

When dyeing textile materials which consist essentially of wool, silk, or man-made polyamide fibers by the exhaustion process, it is often desirable to do so from an acid bath.

Acid anthraquinone dyestuffs suitable for this purpose are known; they dye the above-mentioned polyamide fiber materials in the range of green, blue or violet shades.

Dyeings obtained on the above-mentioned fiber materials with the best known anthraquinone dyestuffs especially of the 1-amino-4-arylamino-anthraquinone type show satisfactory wet fastness properties, especially fastness to milling and to potting, and also good light fastness, but usually draw irreversibilty on to the fibers and have poor migration power; level dyeings must thus be due to level strike of these deystuffs which is only obtainable by the exhaust method, if such critical conditions as temperature and rate of circulation of the dye liquor are strictly controlled.

To obtain level dyeings with the known anthraquinone dyes of satisfactory fastness to potting and milling is particularly difficult in the dyeing of piece goods. The required strict control of temperature and rate of circulation of the dye bath in the machines in which such dyeing is usually carried out, e.g., in winch vats, is highly inconvenient and difficult to achieve.

On the other hand, hitherto known anthraquinone dyes of good migration and "equalizing" power are usually unsatisfactory in the dyeing of polyamide fibers because the wash fastness, fastness to milling, and/or fastness to potting leaves to be desired; often they are also of unsatisfactory light fastness and afford only dull shades.

A further problem exists in the production of green shades by combination of blue anthraquinone dyes with acid yellow dyes from other dyestuff classes (combination dyeing). For this purpose, the blue anthraquinone component, in order to be fully suitable for dyeing in mixtures with such acid yellow dyes, should be capable of drawing on the above-mentioned fibers from an acid and preferably a weakly acid bath, and it should possess, moreover, very good migration and "equalizing" power, and should afford, in mixture with the yellow component, green dyeings on the above-mentioned fibers which are of brilliant shade and good wet fastness properties.

It has further been observed that mixtures of known blue anthraquinone dyes in mixture with yellow dyes of other dyestuff classes, e.g., azo dyes, yield dyeings on the above-mentioned fiber materials, which possess less light fastness than the dyeings obtained on the same materials with the individual dyestuff components.

In order to avoid confusion, the term "equalizing power" (called "Egalisiervermögen" in German language textbooks) is used in this specification in lieu of the frequently used "levelling power," to distinguish properties of a dyestuff which leads to obtainment of level dyeings, such as good migration properties and reversible drawing on the fibers, from those leading to the obtainment of level dyeings with irreversibly drawing dyes due to a "level strike." Different international standard test methods are employed by dyers to test the two types of level dyeing.

By "wet fastness" is meant fastness to water or soap or synthetic detergents, or the like weakly or strongly alkaline media, including alkaline milling and potting, as well as fastness to sea-water and to perspiration. Blue acid anthraquinone dyes which fulfill satisfactorily all of the above requirements have not been known in the past.

Indeed, it has been a long-standing problem in the dyeing of polyamide fibers with anthraquinone dyes to provide such dyestuffs which show improved migration power and draw reversibly onto the fibers from an exhaustion bath, and thus show a good "equalizing" power, whereby level dyeings can be obtained by prolonged dyeing without requiring such strict controls as are necessary in the case of the hitherto known anthraquinone dyes. At the same time, the dyeings obtained with such dyestuffs should show brilliant shades of fully satisfactory wet fastness properties and good light fastness, even in combination dyeing.

Dyestuffs according to a first aspect of this invention, which satisfy these several requirements, especially in dyeing from an acid exhaustion bath, which have good "equalizing" and migrating powers and afford light fast, brilliant shades of good wet fastness properties, are dyestuffs falling under the formula

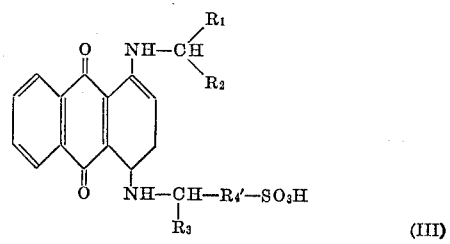

(III)

wherein
each of $R_1$ and $R_2$ represents a lower alkyl group,
$R_3$ represents a lower alkyl group, and
$R_4'$ represents a divalent arylenealkyl group linked with its alkyl moiety to

and with its arylene moiety to the $-SO_3H$ group, and being unsubstituted or ring-substituted by lower alkyl and/or lower alkoxy groups and/or by halogen.

These dyestuffs according to the first aspect of the invention are suitable, in the order of importance, primarily for the dyeing and printing of synthetic polyamide fibers such as nylon or polyurethanes and, secondarily, for the dyeing and printing of natural polyamide fibers such as silk, leather and, particularly, wool. They draw level onto these fibers from a weakly acid to acid bath at higher temperatures and have good migratory and equalizing powers, dyeing wool and nylon equally well, without particularly strict control of dyeing conditions. The pure, brilliant greenish blue or blue dyeings so obtained, e.g., dyeings on wool or nylon, are distinguished by good light fastness and wet fastness properties, particularly fastness to washing, potting and milling. Moreover, the dyestuffs according to the invention are also suitable in admixture with other acid dyestuffs to attain combination dyeings, especially in green shades.

These dyestuffs are structurally distinguished from similar known dyestuffs by the presence of a relatively large number of alkyl carbon atoms, firstly as substituents in the amino nitrogen atom in 1-position at the anthraquinone nucleus, and secondly as part of the substituent of the amino group in 4-position at the same nucleus. The minimum number of carbon atoms in both alkyl portions of the molecule must be six. That thus substituted 1,4-diamino-anthraquinone dyes have good "equalizing" and migrating powers is very unexpected, since it is well known that substitution of, especially, phenylamino-anthraquinones with alkyl substituents of three and especially with five, six and more carbon atoms leads to dyes of high fastness to milling and potting, but accompanied by poor migrating and "equalizing" powers (cf. Venkataraman, "Synthetic Dyes" II, pp. 857–860 (1952)).

In spite of their satisfactory wet fastness properties and especially milling and potting fastness, the equalizing power of the dyestuffs falling under Formula III is most satisfactory.

Dyestuffs falling under Formula III, which possess particularly good all-round properties, are those wherein:

$R_1$ and $R_2$ together contain from 2 to 6 carbon atoms, and especially those in which
$R_1$ represents the methyl group and
$R_2$ either the methyl or the ethyl group,
$R_3$ is advantageously the methyl, ethyl or isobutyl group,
$R_4'$ prepresents a phenylenealkyl group, and especially the benzylene or, still more preferred, the phenethylene group, unsubstituted or substituted by lower alkyl, preferably methyl or ethyl, or lower alkoxy, preferably methoxy or ethoxy; and/or substituted by halogen, particularly by fluorine, chlorine or bromine.

Preferred dyestuffs, because of particularly good wash fastness properties besides the above-mentioned excellent equalizing power, are those falling under Formula III which are of the formula

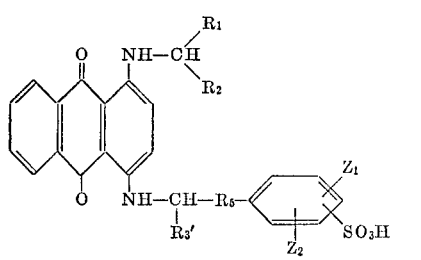

(IIIA)

wherein
each of $R_1$ and $R_2$ represents lower alkyl,
$R_3'$ represents alkyl of from 1 to 2 carbon atoms,
$R_5$ prepresents alkylene of from 1 to 2 carbon atoms, the sum of carbon atoms in $R_1$, $R_2$, $R_3'$ and $R_5$ ranging from five to eight, $Z_1$ represents hydrogen, methyl, methoxy, chlorine or bromine, and
$Z_2$ represents hydrogen, methyl or methoxy.

An optimal combination of wash fastness of their dyeings on nylon and equalizing power is shown by those dyestuffs of Formula IIIA in which the sum of carbon atoms in $R_1$, $R_2$, $R_3'$ and $R_5$ is five to six, and Z, $Z_1$ and $Z_2$ each represents hydrogen.

The unsulfonated dyestuffs of the formula

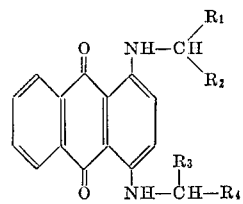

in which $R_1$, $R_2$ and $R_3$ have the meanings given hereinbefore, and $R_4$ has the meaning given infra, are soluble in organic solvent such as alkylketones, e.g. acetone or methylethyl ketone or glycolalkylethers, e.g. Cellosolve; they are useful as disperse dyes in the dyeing of lacquers, and also in the dyeing of cellulose acetate fibers and especially in dope dyeing, in good light-fast and wet-fast shades.

The dyestuffs according to this aspect of the invention are produced by reacting an anthraquinone compound of the formula

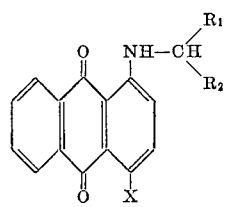

(I)

wherein each of $R_1$ and $R_2$ represents a lower alkyl group, and
X represents a substituent which can be exchanged for an aralkylamino group, for example chlorine, bromine, the hydroxyl or a lower alkoxy group, such as the methoxy group, or the nitro or amino group, chlorine or bromine being preferred, with an aralkylamine of the formula

(II)

wherein $R_3$ represents a lower alkyl group, and
$R_4$ represents an aralkyl group containing in the aryl nucleus at least one exchangeable hydrogen atom and being unsubstituted or ring-substituted by lower alkyl and/or lower alkoxy groups and/or halogen, to form the corresponding 1-sec-alkylamino-4-aralkylamino-anthraquinone compound and sulfonating the latter compound to form a dyestuff of Formula III.

The starting materials of Formula I are obtained by known processes, e.g., by chlorinating or brominating or nitrating the corresponding 1-sec. alkylamino-anthraquinone compound and then, if necessary, exchanging the chlorine or bromine for the hydroxyl or a low alkoxy group, or reducing the nitro group to the amino group.

Starting compounds of Formula I wherein X is the hydroxyl group can also be obtained by reacting 1,4-dihydroxyanthraquinone or its leuco compound or a mixture of these compounds with the corresponding sec. alkylamine. These starting compounds can be reacted direct without isolation to form the intermediate product which after sulphonation corresponds to an end product of Formula III.

The aralkylamines of Formula II are obtained, e.g., according to R. Leuckart (Ber. 18, 2341 (1885)) by reacting ketones of the formula

with ammonium formate or formamide and then splitting off the formyl group. In some cases, they can be obtained by condensing an aromatic aldehyde, e.g., benzaldehyde, with a dialkyl ketone such as acetone and reacting the arylidene ketone obtained in the saturated amine with ammonia and hydrogen in the presence of a catalyst according to G. Mignonac (C.r. 172,223 (1921)).

The reaction of the anthraquinone compound of Formula I with the aralkylamine of Formula II is performed, e.g., in the solution or melt of an excess of aralkylamine as defined, or in an organic solvent not taking part in the reaction. Examples of suitable solvents are aromatic hydrocarbons such as toluene, xylenes or naphthalene; or halogenated or nitrated aromatic hydrocarbons such as chlorobenzene, di- and tri-chlorobenzene or nitrobenzene, respectively; or halogenated aliphatic hydrocarbons such as trichloroethylene; alcohols, e.g., alkanols such as n-butanol, sec. butanol; or alkylene glycol monoalkyl ethers, e.g., ethylene glycol monomethyl or monoethyl ether; aromatic hydroxyl compounds, e.g., phenol and homologues thereof; or tertiary nitrogen bases such as pyridine.

If an anthraquinone compound of Formula I is used as starting material, wherein X is halogen, especially chlorine or bromine, the reaction is advantageously performed in the presence of copper or a copper compound such as copper (I) chloride, and in the presence of an acid buffering agent and, preferably, at a raised temperature.

As acid buffering agent, particularly an excess of the aralkylamine as defined is used, optionally together with an alkali metal salt of a fatty acid such as sodium or potassium acetate or of carbonic acid such as sodium bicarbonate or sodium carbonate, or with an alkali metal hydroxide such as sodium or potassium hydroxide, or with magnesium oxide. Also a tertiary amine such as triisopropanolamine can be used.

The 1-sec. alkylamino-4-aralkylamine-anthraquinone compound obtained is sulphonated by usual methods, for instance, in concentrated sulphuric acid or in oleum under mild conditions, e.g., at room temperature, or with chlorosulphonic acid in a solvent not taking part in the reaction.

A first modification of the process according to the invention consists in reacting an anthraquinone compound of Formula IV

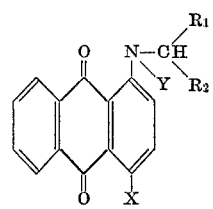

wherein Y represents an acyl radical and $R_1$, $R_2$ and X have the meanings given above, with an aralkylamine of Formula II to form the corresponding 1-(N-sec. alkyl-N-acylamino) - 4 - aralkylamino anthraquinone compound and, in any order desired, saponifying and sulphonating this to form a dyestuff of Formula III.

Y represents, e.g., a carbacyl radical, especially an alkanoyl radical, e.g., the formyl, acetyl or propionyl radical, or an aroyl radical such as the benzoyl radical, or an alkylsulphonyl radical such as the methylsulphonyl radical, or an arylsulphonyl radical such as the phenylsulphonyl or p-methylphenylsulphonyl radical. Preferably Y is the acetyl radical.

The starting materials of Formula IV are obtained by known methods, e.g., by reacting an anthraquinone compound of Formula I with an acylating agent introducing the radical Y, preferably with acetyl chloride or bromide or with acetanhydride.

The anthraquinone compounds of Formula IV are reacted with the aralkylamines of Formula II in analogous manner as described in the first process. The 1-(N-sec. alkyl - N - acylamino) - 4 - aralkylamino - anthraquinone compounds which are obtained in very good yields, are preferably first saponified and then sulphonated. Saponification is performed advantageously in aqueous acid medium, e.g., in aqueous sulphuric acid and, preferably, at a raised temperature. Sulphonation is performed as described in the first process. The quantitative reaction of an acylamino-anthraquinone compound of Formula IV with an aralkylamine of Formula II and the subsequent quantitative saponification of the acyl radical are unexpected, as normally when phenylamines are used instead of aralkylamines, insufficient yields are obtained on splitting off the acyl radical.

A second modification of the process according to the invention consists in reacting an anthraquinone compound of Formula V

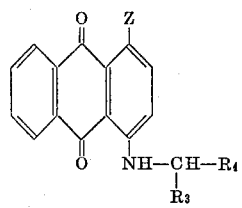

wherein Z represents a substituent which can be exchanged for a sec. alkylamino group and $R_3$ and $R_4$ have the meanings given above, with a (sec. alkyl)-amine of Formula VI

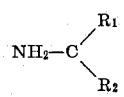

wherein $R_1$ and $R_2$ have the meanings given above, to form the corresponding 1-sec. alkylamino-4-aralkylamino-anthraquinone compound and sulphonating this to form a dye-stuff of Formula III. Z is like X especially chlorine or bromine.

Starting materials of Formula V are known or can be produced by known methods, e.g., by reacting 1-chloro- or 1-bromo- or 1-nitro- 4-alkoxy-anthraquinone with an aralkylamine of Formula II and, if desired, converting the chlorine or bromine into a low alkoxy group or reducing the nitro group to the amino group.

Starting compounds wherein Z is the hydroxyl group can be produced by reacting 1,4-dihydroxy-anthraquinone, its leuco compounds or a mixture of these compounds with an aralkylamine of Formula II. They can be reacted with the (sec. alkyl)-amine of Formula VI without having to be isolated and the reaction product obtained is then sulphonated.

A third modification of the process according to the invention consists in reacting an anthraquinone compound of Formula VII

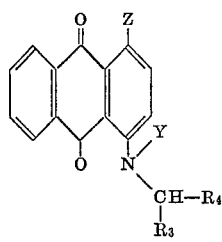

wherein $R_3$ and $R_4$ have the meanings given in Formula II, Y that given in Formula IV and Z that given in Formula V, with a (sec. alkyl)-amine of Formula VI to form the corresponding 1-sec. alkylamino-4-(N-aralkyl-N-acylamino)-anthraquinone compound and, in any order desired, saponifying and sulphonating this to form a dyestuff of Formula III.

The anthraquinone compounds of Formula VII are obtained by methods known per se, e.g., by reacting an anthraquinone compound of Formula V with an acylating agent introducing the radical Y, preferably with acetyl chloride or bromide or with acetanhydride.

The reaction of the acylamino-anthraquinone compound of Formula VII with the (sec. alkyl)-amine of Formula VI and the saponification of the 1-sec. alkylamino - 4 - (N - aralkyl - N - acylamino) - anthraquinone compound obtained are performed analogously to the process described in the first modification of the process according to the invention giving very good yields. The sulphonation is performed as described in the first process. In this case too, it is of advantage to first saponify and then sulphonate.

The end products of Formula III are advantageously isolated in the form of alkali metal salts, preferably as sodium salts. They are very soluble in water.

In the sulfonation of the unsulfonated dyestuffs of the formula

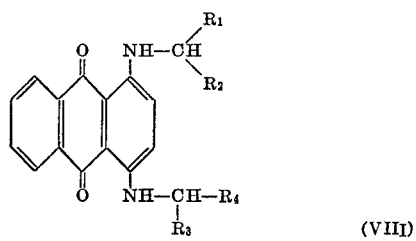

wherein $R_1$, $R_2$, $R_3$ and $R_4$ have the meanings given hereinbefore, one sulfonic acid group is introduced into the above dyestuff molecule.

Therefore, a sulfuric acid ranging from at least about 90% concentration, up to oleum having a content of 10% $SO_3$, or chlorosulfonic acid, may be used as sulfonating agent, and the temperature applied ranges from about 15° to 35° C., i.e., room temperature, but the progress of sulfonation should be controlled, which can easily be done by known techniques, e.g., by thin layer chromatography of control samples, or determination of the solubility of such samples, neutralized with sodium carbonate, in water.

The sulfonic acid group is attached to a carbon atom of the phenyl nucleus of the aralkyl moiety $R_4$ in the above Formula VIII. It will enter in ortho-, meta- and para-position in proportions which depend on the absence or presence of substituents in that nucleus. The isomers thus constituting the dyestuffs falling under Formula III can be isolated by known chromatographic techniques and the position of the sulfonic acid group in each individual isomer could be determined by infrared and magneto-nuclear resonance spectra. However, since the isomers thus obtained would be of no superior dyeing properties and their isolation would be highly uneconomical, such separation would be without any technical value.

The term "lower" as used in this specification including the claims in connection with "alkyl" and "alkoxy" means that these radicals have from 1 to 4 carbon atoms.

The following non-limitative examples illustrate this aspect of the invention further. The temperatures are given therein in degrees centigrade. Where not otherwise stated, parts and percentages are given by weight.

Example 1

A mixture of 17.2 g. of 1-isopropylamino-4-bromo-anthraquinone, 19 g. of 1-phenyl-3-amino-butane, 5 g. of anhydrous potassium acetate, 0.005 g. of cuprous chloride, 0.10 ml. of water and 3 ml. of ethylene glycol monoethyl ether is stirred for 48 hours at a temperature of 110°. 60 ml. of n-butanol are added to the mixture which is then allowed to cool whereupon the reaction product precipitates. It is filtered off and washed, first with n-butanol and then with methanol. To further purify, the product is extracted hot with methanol and then recrystallised from n-butanol. The product of the formula

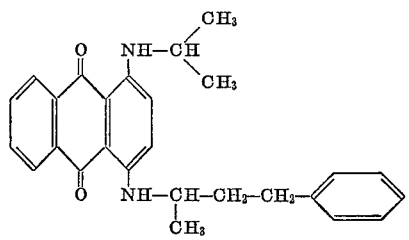

is obtained as a blue powder which melts at 134°. This is added to 10 times the amount of 96% sulphuric acid at 23–25°, the whole is stirred for 6 hours at this temperature and then poured onto a mixture of ice and sodium chloride whereupon the precipitated dyestuff is filtered off. The dyestuff is slurried in water, the pH is adjusted to 7 with sodium hydroxide solution, the whole is heated to 60°, whereupon the dyestuff partly dissolves, and 10% (calculated on the volume of the solution) of sodium chloride is added. The dyestuff precipitates. It is filtered off, washed with dilute sodium chloride solution and dried.

Nylon and wool are dyed from a weakly acid bath in pure blue shades which are wet and light fast. The dyestuff has good migratory powers and is suitable, in particular, for attaining pure green shades in combination with yellow dyestuffs.

If, instead of 17.2 g. of 1-isopropylamino-4-bromo-anthraquinone, 15 g. of 1-isopropylamino-4-chloro-anthraquinone are used (obtained by chlorinating 1-isopropylamino-anthraquinone with sulphuryl chloride in nitrobenzene) and otherwise the procedure given in Example 1 is followed, then the same dyestuff is obtained.

If, with the same procedure, instead of 1-isopropylamino-4-bromo-anthraquinone and 1-phenyl - 3 - amino-butane, equivalent amounts of the 1-sec. alkylamino-4-halogeno-anthraquinones (column 2) and phenyl-alkyl-amines (column 3) given in the following Table I are used, then dyestuffs having similar properties are obtained.

TABLE I

| No. | 1-sec. alkylamino-4-halogeno-anthraquinone | Phenyl-alkylamine |
|---|---|---|
| 2 | 1-isopropylamino-4-bromo-anthraquinone (NH–CH(CH₃)₂ at 1-position, Br at 4-position) | NH₂–CH(CH₃)–CH(CH₃)–CH₂–C₆H₅ |
| 3 | 1-(sec-butylamino)-4-bromo-anthraquinone (HN–CH(CH₃)–CH₂–CH₃) | NH₂–CH(CH₃)–CH₂–C₆H₅ |
| 4 | 1-(sec-butylamino)-4-bromo-anthraquinone (NH–CH(CH₃)–CH₂–CH₃... shown as NH–CH(CH₃)–CH₃ variant) | NH₂–CH–CH₂–CH₂–C₆H₅, with CH₂–CH(CH₃)₂ branch |
| 5 | 1-(sec-butylamino)-4-bromo-anthraquinone (NH–CH(CH₃)–CH₂–CH₃) | NH₂–CH–CH₂–CH₂–C₆H₅, with CH₂–CH(CH₃)₂ branch |

Example 6

A mixture of 19.3 g. of 1-(N-acetyl-N-isopropylamino)-4-bromo-anthraquinone and 16.2 g. of 1-phenyl-3-amino butane is stirred for 20 hours at a temperature of 110°. The red melt obtained is then poured onto a mixture of 200 g. of ice and 200 ml. of 2 N hydrochloric acid whereupon the compound of the formula

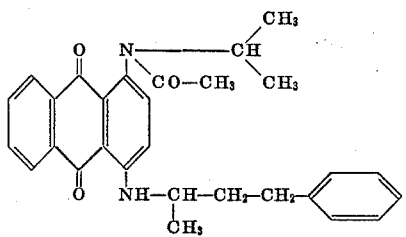

separates as a red resin. The aqueous hydrochloric acid phase is decanted from the intermediate product formed and the latter is dissolved by adding it in portions to 100 ml. of 80% sulphuric acid. This solution is stirred for 8 hours at a temperature of 50° and then poured onto ice whereupon the product described by the formula in Example 1 precipitates. It is purified by recrystallisation from n-butanol. Sulphonation is performed as described in Example 1.

If with otherwise the same procedure, instead of 1-(N-acetyl-N-isopropylamino)-4-bromo-anthraquinone and 1-phenyl-3-amino butane, equivalent amounts of the 1-(N-acetyl-N-sec. alkylamino)-4-halogeno-anthraquinones (column 2) or phenylalkylamines are used (column 3) of the following Table II, then dyestuffs having similar properties are obtained.

TABLE II

| No. | 1-(N-acetyl-N-sec.alkylamino)-4-halogeno-anthraquinone | Phenyl-alkylamine |
|---|---|---|
| 7 | 1-(N-acetyl-N-isopropylamino)-4-bromo-anthraquinone (N with CH(CH₃)₂ and CO–CH₃, Br at 4-position) | C₆H₅–CH₂–CH(CH₃)–NH₂ |

TABLE II—Continued

| No. | 1-(N-acetyl-N-sec.alkylamino)-4-halogeno-anthraquinone | Phenyl-alkylamine |
|---|---|---|
| 8 | 1-[N-(isopropyl)-N-acetylamino]-4-bromoanthraquinone | 2-Cl-C₆H₄-CH₂-CH(CH₃)-NH₂ |
| 9 | 1-[N-(isopropyl)-N-acetylamino]-4-bromoanthraquinone | 3-Cl-C₆H₄-CH₂-CH(CH₃)-NH₂ |
| 10 | 1-[N-(isopropyl)-N-acetylamino]-4-bromoanthraquinone | 4-Cl-C₆H₄-CH₂-CH(CH₃)-NH₂ |
| 11 | 1-[N-(isopropyl)-N-acetylamino]-4-bromoanthraquinone | 4-CH₃-C₆H₄-CH₂-CH(CH₃)-NH₂ |
| 12 | 1-[N-(isopropyl)-N-acetylamino]-4-bromoanthraquinone | 2,4-(CH₃)₂-C₆H₃-CH₂-CH(CH₃)-NH₂ |
| 13 | 1-[N-(isopropyl)-N-acetylamino]-4-bromoanthraquinone | 2-OCH₃-C₆H₄-CH₂-CH(CH₃)-NH₂ |
| 14 | 1-[N-(isopropyl)-N-acetylamino]-4-bromoanthraquinone | C₆H₅-CH₂-CH(C₂H₅)-NH₂ |

TABLE II—Continued

| No. | 1-(N-acetyl-N-sec.alkylamino)-4-halogeno-anthraquinone | Phenyl-alkylamine |
|---|---|---|
| 15 | 1-[N-(isopropyl)-N-acetylamino]-4-bromoanthraquinone | 4-Cl-C₆H₄-CH₂-CH(NH₂)-CH₂-CH₃ |
| 16 | 1-[N-(isopropyl)-N-acetylamino]-4-bromoanthraquinone | 2-Cl-C₆H₄-CH₂-CH(NH₂)-CH₂-CH₃ |
| 17 | 1-[N-(isopropyl)-N-acetylamino]-4-bromoanthraquinone | 2-Cl-C₆H₄-CH₂-CH₂-CH(NH₂)-CH₃ |
| 18 | 1-[N-(isopropyl)-N-acetylamino]-4-bromoanthraquinone | 3-Cl-C₆H₄-CH₂-CH₂-CH(NH₂)-CH₃ |
| 19 | 1-[N-(isopropyl)-N-acetylamino]-4-bromoanthraquinone | 4-Cl-C₆H₄-CH₂-CH₂-CH(NH₂)-CH₃ |
| 20 | 1-[N-(isopropyl)-N-acetylamino]-4-bromoanthraquinone | 2-CH₃-C₆H₄-CH₂-CH₂-CH(NH₂)-CH₃ |
| 21 | 1-[N-(isopropyl)-N-acetylamino]-4-bromoanthraquinone | 2,4-(CH₃)₂-C₆H₃-CH₂-CH₂-CH(NH₂)-CH₃ |

TABLE II—Continued

| No. | 1-(N-acetyl-N-sec.alkylamino)-4-halogeno-anthraquinone | Phenyl-alkylamine |
|---|---|---|
| 22 | 1-[N-(isopropyl)-N-acetylamino]-4-bromoanthraquinone | $H_3C-C_6H_4-CH_2-CH_2-CH(CH_3)-NH_2$ |
| 23 | 1-[N-(isopropyl)-N-acetylamino]-4-bromoanthraquinone | 2,5-(CH_3)_2-C_6H_3-CH_2-CH_2-CH(CH_3)-NH_2 |
| 24 | 1-[N-(isopropyl)-N-acetylamino]-4-bromoanthraquinone | 2-$OCH_3$-$C_6H_4$-$CH_2$-$CH_2$-$CH(CH_3)$-$NH_2$ |
| 25 | 1-[N-(isopropyl)-N-acetylamino]-4-bromoanthraquinone | $C_6H_5$-$CH_2$-$CH(CH_3)$-$CH(CH_3)$-$NH_2$ |
| 26 | 1-[N-(isopropyl)-N-acetylamino]-4-bromoanthraquinone | 2-Cl-$C_6H_4$-$CH_2$-$CH(CH_3)$-$CH(CH_3)$-$NH_2$ |
| 27 | 1-[N-(isopropyl)-N-acetylamino]-4-bromoanthraquinone | 4-Cl-$C_6H_4$-$CH_2$-$CH(CH_3)$-$CH(CH_3)$-$NH_2$ |
| 28 | 1-[N-(isopropyl)-N-acetylamino]-4-bromoanthraquinone | 2-$CH_3$-$C_6H_4$-$CH_2$-$CH(CH_3)$-$CH(CH_3)$-$NH_2$ |

TABLE II—Continued

| No. | 1-(N-acetyl-N-sec.alkylamino)-4-halogeno-anthraquinone | Phenyl-alkylamine |
|---|---|---|
| 29 | 1-[N-acetyl-N-(isopropyl)amino]-4-bromo-anthraquinone with N(CH(CH₃)₂)(COCH₃) substituent | C₆H₅–CH₂–CH(CH₃)–CH(NH₂)–CH₂–CH₃ |
| 30 | same anthraquinone as 29 | 2-Cl-C₆H₄–CH₂–CH(CH₃)–CH(NH₂)–CH₂–CH₃ |
| 31 | same anthraquinone as 29 | C₆H₅–CH₂–CH₂–CH(NH₂)–CH₂–CH₃ |
| 32 | same anthraquinone as 29 | 2-Cl-C₆H₄–CH₂–CH₂–CH(NH₂)–CH₂–CH₃ |
| 33 | same anthraquinone as 29 | 4-Cl-C₆H₄–CH₂–CH₂–CH(NH₂)–CH₂–CH₃ |
| 34 | 1-[N-acetyl-N-(isopropyl)amino]-4-chloro-anthraquinone | C₆H₅–CH₂–CH₂–CH(NH₂)–CH₃ |
| 35 | same anthraquinone as 34 | C₆H₅–CH₂–CH(NH₂)–CH₃ |

TABLE II—Continued

| No. | 1-(N acetyl-N-sec.alkylamino)-4-halogeno-anthraquinone | Phenyl-alkylamine |
|---|---|---|
| 36 | 1-[N(CH(CH₃)₂)-N-CO-CH₃]-4-Cl-anthraquinone | C₆H₅-CH₂-CH(CH₃)-CH-NH₂ with CH₃ |
| 37 | 1-[N(CH(CH₃)₂)-N-CO-CH₃]-4-Cl-anthraquinone | C₆H₅-CH₂-CH₂-CH(CH₂-CH₃)-NH₂ |
| 38 | 1-[N(CH(CH₃)(CH₂-CH₃))-N-CO-CH₃]-4-Br-anthraquinone | C₆H₅-CH₂-CH(CH₃)-NH₂ |
| 39 | 1-[N(CH(CH₃)(CH₂-CH₃))-N-CO-CH₃]-4-Br-anthraquinone | 2-Cl-C₆H₄-CH₂-CH(CH₃)-NH |
| 40 | 1-[N(CH(CH₃)(CH₂-CH₃))-N-CO-CH₃]-4-Br-anthraquinone | 3-Cl-C₆H₄-CH₂-CH(CH₃)-NH |
| 41 | 1-[N(CH(CH₃)(CH₂-CH₃))-N-CO-CH₃]-4-Br-anthraquinone | 4-Cl-C₆H₄-CH₂-CH(CH₃)-NH₂ |
| 42 | 1-[N(CH(CH₃)(CH₂-CH₃))-N-CO-CH₃]-4-Br-anthraquinone | 2-CH₃-C₆H₄-CH₂-CH(CH₃)-NH₂ |

TABLE II—Continued

| No. | 1-(N-acetyl-N-sec.alkylamino)-4-halogeno-anthraquinone | Phenyl-alkylamine |
|---|---|---|
| 43 | 1-(N-acetyl-N-sec-butylamino)-4-bromoanthraquinone | H₃C—C₆H₄—CH₂—CH(CH₃)—NH₂ (para) |
| 44 | 1-(N-acetyl-N-sec-butylamino)-4-bromoanthraquinone | o-CH₃O—C₆H₄—CH₂—CH(CH₃)—NH₂ |
| 45 | 1-(N-acetyl-N-sec-butylamino)-4-bromoanthraquinone | C₆H₅—CH₂—CH₂—CH(CH₃)—NH₂ |
| 46 | 1-(N-acetyl-N-sec-butylamino)-4-bromoanthraquinone | o-Cl—C₆H₄—CH₂—CH₂—CH(CH₃)—NH₂ |
| 47 | 1-(N-acetyl-N-sec-butylamino)-4-bromoanthraquinone | p-Cl—C₆H₄—CH₂—CH₂—CH(CH₃)—NH₂ |
| 8 | 1-(N-acetyl-N-sec-butylamino)-4-bromoanthraquinone | o-CH₃—C₆H₄—CH₂—CH₂—CH(CH₃)—NH₂ |
| 49 | 1-(N-acetyl-N-sec-butylamino)-4-bromoanthraquinone | p-H₃C—C₆H₄—CH₂—CH₂—CH(CH₃)—NH₂ |

TABLE II—Continued

| No. | 1-(N-acetyl-N-sec.alkylamino)-4-halogeno-anthraquinone | Phenyl-alkylamine |
|---|---|---|
| 50 | 1-[N-acetyl-N-(1-methylpropyl)amino]-4-bromoanthraquinone | C₆H₅–CH₂–CH(CH₃)–CH(CH₃)–NH₂ |
| 51 | 1-[N-acetyl-N-(1-methylpropyl)amino]-4-bromoanthraquinone | C₆H₅–CH₂–CH₂–CH(C₂H₅)–NH₂ |
| 52 | 1-[N-acetyl-N-(1-methylpropyl)amino]-4-chloroanthraquinone | C₆H₅–CH₂–CH(CH₃)–NH₂ |
| 53 | 1-[N-acetyl-N-(1-methylpropyl)amino]-4-chloroanthraquinone | C₆H₅–CH₂–CH₂–CH(CH₃)–NH₂ |
| 54 | 1-[N-acetyl-N-(1-methylpropyl)amino]-4-chloroanthraquinone | C₆H₅–CH₂–CH(CH₃)–CH(CH₃)–NH₂ |
| 55 | 1-[N-acetyl-N-(1-methylpropyl)amino]-4-chloroanthraquinone | C₆H₅–CH₂–CH₂–CH(C₂H₅)–NH₂ |
| 56 | 1-[N-acetyl-N-(1-methylbutyl)amino]-4-bromoanthraquinone | C₆H₅–CH₂–CH(CH₃)–NH₂ |

TABLE II—Continued
| No. | 1-(N-acetyl-N-sec.alkylamino)-4-halogeno-anthraquinone | Phenyl-alkylamine |
|---|---|---|
| 57 | 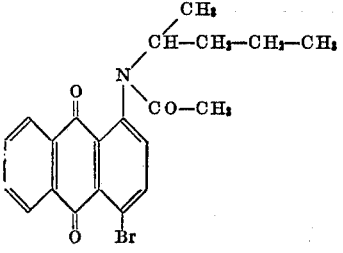 | 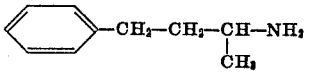 |
| 58 | 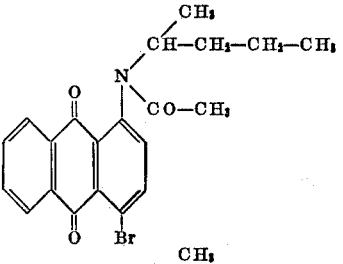 | 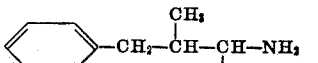 |
| 59 | 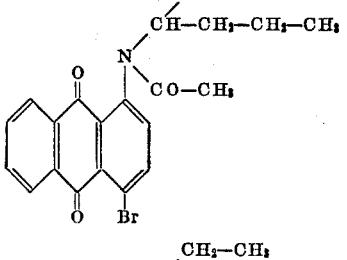 | 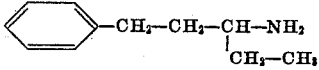 |
| 60 | 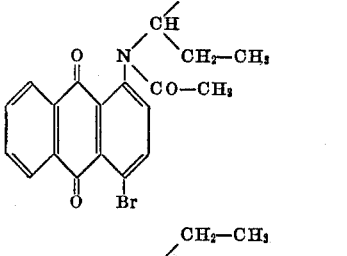 | 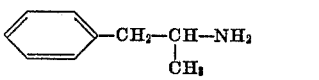 |
| 61 | 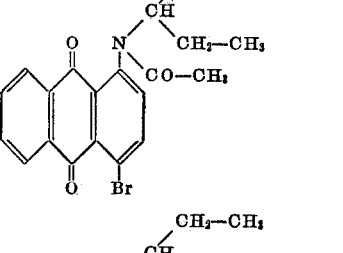 | 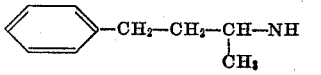 |
| 62 | 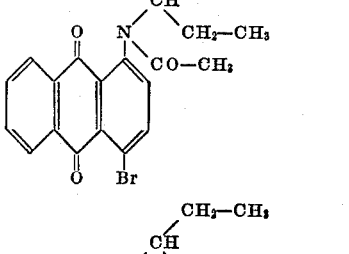 | 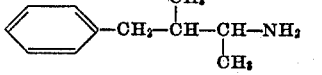 |
| 63 | 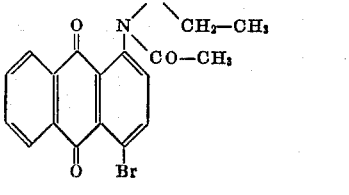 | 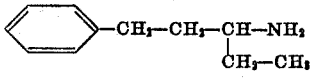 |

TABLE II—Continued

| No. | 1-(N-acetyl-N-sec.alkylamino)-4-halogeno-anthraquinone | Phenyl-alkylamine |
|---|---|---|
| 64 | 1-[N-(CH(CH₃)-CH(CH₃)₂)-N-COCH₃-amino]-4-bromo-anthraquinone | C₆H₅-CH₂-CH(CH₃)-NH₂ |
| 65 | 1-[N-(CH(CH₃)-CH(CH₃)₂)-N-COCH₃-amino]-4-bromo-anthraquinone | C₆H₅-CH₂-CH₂-CH(CH₃)-NH₂ |
| 66 | 1-[N-(CH(CH₃)-CH(CH₃)₂)-N-COCH₃-amino]-4-bromo-anthraquinone | C₆H₅-CH₂-CH(CH₃)-CH(CH₃)-NH₂ |
| 67 | 1-[N-(CH(CH₃)-CH(CH₃)₂)-N-COCH₃-amino]-4-bromo-anthraquinone | C₆H₅-CH₂-CH₂-CH(CH₂-CH₃)-NH₂ |
| 68 | 1-[N-(CH(CH₃)-CH₂-CH₃)-N-COCH₃-amino]-4-chloro-anthraquinone | C₆H₅-CH₂-CH₂-CH(CH₃)-NH₂ |
| 69 | 1-[N-(CH(CH₃)-CH₂-CH₃)-N-COCH₃-amino]-4-chloro-anthraquinone | C₆H₅-CH₂-CH(CH₃)-NH₂ |
| 70 | 1-[N-(CH(CH₃)₂)-N-CO-C₆H₅-amino]-4-bromo-anthraquinone | C₆H₅-CH(CH₂-CH₃)-NH₂ |

TABLE II—Continued

| No. | 1-(N-acetyl-N-sec.alkylamino)-4-halogeno-anthraquinone | Phenyl-alkylamine |
|---|---|---|
| 71 | 1-(N-isopropyl-N-methylsulfonyl)-4-bromo-anthraquinone derivative | C₆H₅—CH₂—CH₂—CH(CH₃)—NH₂ |
| 72 | 1-(N-isopropyl-N-phenylsulfonyl)-4-bromo-anthraquinone derivative | C₆H₅—CH₂—CH₂—CH(CH₃)—NH₂ |
| 73 | 1-(N-isopropyl-N-(p-tolylsulfonyl))-4-bromo-anthraquinone derivative | C₆H₅—CH₂—CH(CH₃)—NH₂ |
| 74 | 1-(N-isopropyl-N-acetyl)-4-bromo-anthraquinone derivative | Br—C₆H₄—CH₂—CH(CH₃)—NH₂ |
| 75 | 1-(N-isopropyl-N-propionyl)-4-bromo-anthraquinone derivative | H₅C₂O—C₆H₄—CH₂—CH(CH₃)—NH |
| 76 | 1-(N-sec-butyl-N-acetyl)-4-bromo-anthraquinone derivative | CH₃—C₆H₃(Br)—CH₂—CH(CH₃)—NH₂ |
| 77 | 1-(N-isopropyl-N-acetyl)-4-bromo-anthraquinone derivative | N₅C₂O—C₆H₄—CH₂—CH₂—CH(CH₃)—NH₂ |

TABLE II—Continued

| No. | 1-(N-acetyl-N-sec.alkylamino)-4-halogeno-anthraquinone | Phenyl-alkylamine |
|-----|--------------------------------------------------------|-------------------|
| 78  | ![structure]                                           | ![structure]      |
| 79  | ![structure]                                           | ![structure]      |

Example 80

A mixture of 12 g. of 1 - (N - sec. butylamino)-4-hydroxy - anthraquinone (obtained by reacting sec. butylamine with leuco - 1,4 - dihydroxy - anthraquinone), 18 g. of 1 - phenyl - 3 - amino butane, 40 g. of phenol and 9 g. of zinc dust is stirred for 18 hours at a temperature of 90° whereupon 2 N hydrochloric acid is added to the reaction mixture until it has a strong acid reaction. The phenol is then removed by steam distillation. The precipitated reaction product which remains is filtered off, washed first with 2 N hydrochloric acid and then with water and dried, whereupon a blue powder is obtained. The pure product of the formula

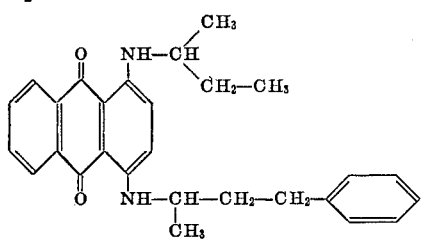

is obtained by chromatography on an aluminium oxide column followed by recrystallisation. It melts at 104°. This product is added to 96% sulphuric acid at 25° and sulphonated for 6 hours at this temeprature. The dyestuff obtained has properties similar to those of the product described in Example 1.

If instead of 1 - (N - sec. butylamino) - 4 - hydroxyanthraquinone, the equivalent amount of 1 - (N - sec. butylamino) - 4 - amino - anthraquinone (obtained by reduction from 1 - (N - sec. butylamino) - 4 - nitroanthraquinone) is used with otherwise the same procedure, the anthraquinone compound of the above formula is obtained which is sulphonated as described in Example 80.

Example 81

A mixture of 30 g. of 1 - (N - isopropylamino) - 4 - methoxy - anthraquinone (obtained by methylation of 1 - (N - isopropylamino) - 4 - hydroxy - anthraquinone) and 50 g. of 1 - phenyl - 2 - methyl - 3 - aminobutane is stirred for 24 hours at a temperature of 150°. After cooling, the mixture is diluted with 250 ml. of methanol, the precipitated product is filtered off, washed with methanol and recrystallised from n-butanol. The product of the formula

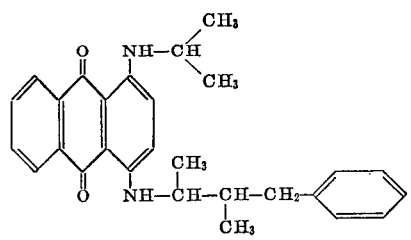

is obtained which is sulphonated as described in Example 1. The dyestuff obtained has good migratory powers and dyes nylon and wool from a weakly acid bath in pure blue shades which are wet and light fast.

If instead of 1 - (N - isoproplamino) - 4 - methoxyanthraquinone equivalent amounts of 1 - (N - isopropylamino) - 4 - nitro - anthraquinone are used (obtained by reacting 1 - methoxy - 4 - nitroanthraquinone with isopropylamine) and otherwise the procedure described in Example 81 is followed, then the same dyestuff is obtained.

Example 82

A mixture of 39 g. of the compound of the formula

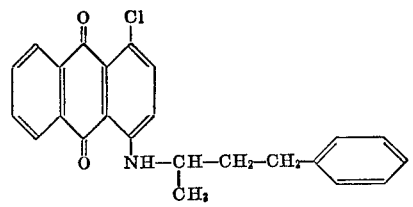

(obtained by reacting 1 - chloro - 4 - methoxy - anthraquinone with 1 - phenyl - 3 - amino - butane), 30 g. of 3 - aminopentane, 10 g. of anhydrous potassium acetate, 0.01 g. of cuprous chloride, 0.3 ml. of water and 50 ml. of n-butanol are stirred in an autoclave for 48 hours at a temperature of 120°. After cooling, 200 ml. of methanol are poured slowly into the mixture while stirring whereupon the product formed precipitates. This is filtered off, washed with methanol, then with hot 2 N hydrochloric acid and finally with water and dried. By recrystallisation from n-butanol, the product of the formula

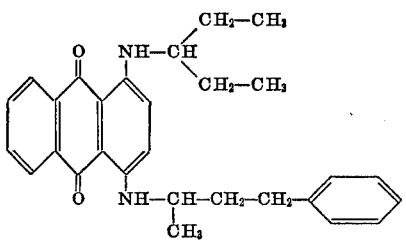

is obtained which is sulphonated as described in Example 1. A dyestuff is obtained which dyes nylon and wool from a weakly acid bath in wash fast blue shades.

Example 83

If, instead of 1 - chloro - 4 - [4' - phenylbutyl-(2')-amino] - anthraquinone, the corresponding 1 - bromo-anthraquinone compound is used (obtained by reacting 1 - bromo - 4 - methoxy - anthraquinone with 1 - phenyl-3 - aminobutane) and otherwise the same procedure as given in Example 82 is followed, then the same dyestuff is obtained.

Example 84

A mixture of 54 g. of the compound of the formula

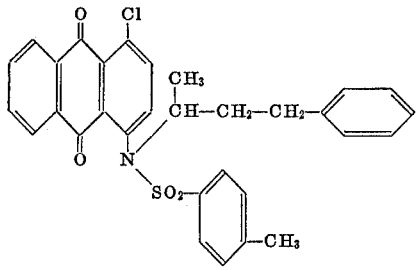

(obtained by tosylating the corresponding 1 - chloro-4-aralkyl - amino - anthraquinone compound), 30 g. of 2 - amino - 3 - methyl - butane and 100 ml. of n-butanol is stirred in an autoclave for 24 hours at a temperature of 110° whereupon the reaction mixture is subjected to steam distillation. The residue, a red resin, is added in portions to 600 g. of 80% sulphuric acid and the solution is stirred for 10 hours at a temperature of 60° whereupon the tosyl radical is split off. The solution is poured onto ice, the precipitated product is filtered off and recrystallised from n-butanol. The pure product of the formula

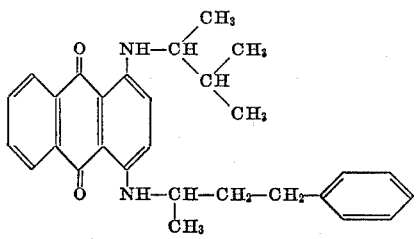

so obtained is sulphonated as described in Example 1. The dyestuff obtained dyes nylon and wool from a weakly acid bath in blue shades which have good fastness to washing.

If instead of the 4 - (N - tosylamino) - anthraquinone compound of the first formula given above, equivalent amounts of the corresponding 4 - (N - phenyl - sulphonyl-amino)-, 4 - (N - methylsulphonylamino)-, 4 - (N-acetylamino)- or 4 - (N-benzoylamino) - anthraquinone compound are used, then, with otherwise the same procedure, the same dyestuff is obtained.

Example 85

A mixture of 14.5 g. of the compound of the formula

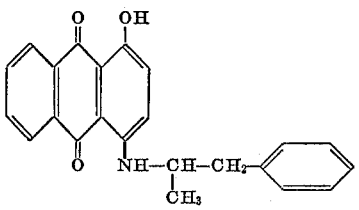

(obtained by reacting leuco-1,4-dihydroxy-anthraquinone with 1-phenyl-2-aminopropane), 20 g. of sec. butylamine, 40 g. of phenol and 9 g. of zinc dust is stirred for 18 hours in an autoclave at a temperature of 100°. The reaction mixture is put into a flask fitted with a stirrer, 300 ml. of ethanol and 50 ml. of 30% sodium hydroxide solution are added and the whole is stirred under reflux while simultaneously introducing a stream of air until no more leuco compound can be detected. The precipitate formed is filtered off, washed with methanol and then with water and then dried. By chromatography on an aluminium oxide column and recrystallisation the compound of the formula

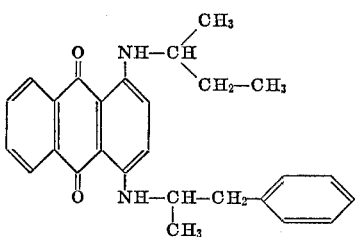

is obtained which, when sulphonated as described in Example 1, yields a dyestuff having good migratory power when dyed onto wool and nylon.

If with otherwise the same procedure, instead of the 1-hydroxyanthraquinone compound of the formula first given above, an equivalent amount of the corresponding 1-aminoanthraquinone compound is used, then the same dyestuff is obtained.

Example 86

A mixture of 37 g. of the compound of the formula

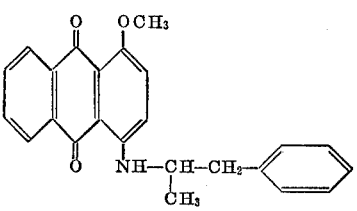

(obtained by methylation of the corresponding 1-hydroxy-anthraquinone compound), 40 g. of sec. butylamine and 100 ml. of n-butanol is stirred in an autoclave for 24 hours at a temperature of 150°. 100 ml. of methanol are slowly poured into the mixture at a temperature of 60° whereupon the product formed precipitates. After cooling, the product is filtered off and recrystallised from n-butanol. The product is identical with that described in Example 85 and it is sulphonated as there described.

If, instead of the 1-methoxy-anthraquinone compound of the above formula, an equivalent amount of the corresponding 1-nitro-anthraquinone compound is used (obtained by reacting 1-nitro-4-methoxy-anthraquinone with 1-phenyl-2-aminopropane) and otherwise the procedure described in Example 86 is followed, then the same dyestuff is obtained.

Example 87

A mixture of 16 g. of 1,4-dihydroxy-anthraquinone, 8 g. of leuco-1,4-dihydroxy-anthraquinone, 16 g. of 1- phenyl-3-amino-butane and 50 ml. of sec. butanol is stirred for 18 hours at a temperature of 50–55°. 25 g. of isopropylamine are added to the mixture without isolating the corresponding 1-hydroxy-4-aralkyl-amino-anthraquinone obtained, and the whole is stirred in an autoclave for 20 hours at a temperature of 100°. The reaction mixture as well as 250 ml. of methanol are poured into a stirring flask and the mixture is stirred under reflux while simultaneously introducing air until no more leuco compound can be detected. After cooling, the precipitated product is filtered off and washed with methanol and then recrystallised from n-butanol. This product is identical with that of Example 1 and is sulphonated as there described.

If the mixture first given above of 1,4-dihydroxy-anthraquinone and leuco-1,4-dihydroxy-anthraquinone is reacted in a first step with the isopropylamine and in a second step with 1-phenyl-3-aminobutane, then the same end product is obtained with otherwise analogous procedure.

Example 88

10 g. of wool flannel are introduced at 40° into a dyebath containing 0.50 g. of sodium sulphate, 0.40 g. of 40% acetic acid and 0.20 g. of dyestuff according to Example 1 in 500 ml. of water, and the temperature is evenly raised to the boiling point within 30 minutes. The flannel is dyed for 1 hour at a light boil, then rinsed and finished in the usual way. A very level, brilliant blue dyeing is obtained which has good fastness to washing and light.

Example 89

10 g. of nylon 66 fabric are introduced into a 40° warm dyebath which contains 0.40 g. of 40% acetic acid, 0.25 g. of the sulphonate of ricinoleic acid butyl ester and 0.20 g. of the dyestuff obtained according to Example 1 in 500 ml. of water. The bath is brought evenly up to the boil within 30 minutes and dyeing is performed for 1 hour at a light boil. The fabric is then rinsed and dried. A level, brilliant blue dyeing is obtained which has good fastness to washing and light.

Example 90

10 g. of the dyestuff of the formula

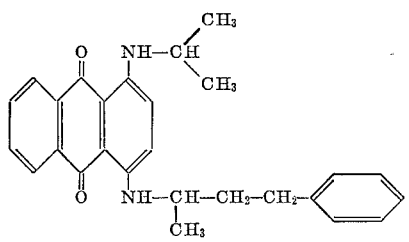

is dissolved in 1000 ml. of acetone and the solution is added with stirring to a solution of 2000 g. of 2.5-cellulose acetate in 14,500 ml. of acetone. The resulting solution is poured onto a glass support to have a thickness, in the wet state, of about 1000 microns; after evaporation of the acetone solvent at room temperature, a film having a thickness of about 150 microns is obtained which is clear, transparent and of brilliant blue shade having good light fastness.

A second aspect of the present invention concerns other classes of new acid anthraquinone dyestuffs, processes for the production thereof, their use for the dyeing and printing of polyamide fibers as well as, as industrial products, the material dyed and printed therewith.

A great number of anthraquinone dyestuffs having very good fastness properties, particularly wet fastness properties, are known. But some of them are unsatisfactory in certain respects, for example, insufficient drawing power from a neutral bath, tendency to produce tippy dyeings, insufficient brilliancy or they cannot be combined well with other dyestuffs of this class.

Thus, while the blue anthraquinone dyestuffs according to the first aspect of the invention can be mixed with yellow dyestuffs of other classes which dye polyamide fibers, especially nylon or wool, from an acid exhaustion bath, in order to obtain various green shades, it is not possible to use these anthraquinone dyes for the dyeing of blended fiber materials containing the aforesaid polyamide fibers and another non-polyamide fiber component, if the latter component requires dyeing from a substantially neutral dyebath. They are also not suitable for the dyeing of the above mentioned polyamide fibers or the afore-mentioned blended fibers when they are to be used in mixture with yellow dyes of other dyestuff classes, for the purpose of obtaining green shades, if these yellow dyes do not permit use of an acid exhaustion bath but draw only from a substantially neutral medium.

These requirements are fully met by dyestuffs pertaining to the second aspect of the present invention. Moreover these new dyestuffs yield dyeings on the above-mentioned polyamide and blended fiber materials which are distinguished by specially outstanding wet fastness properties and brilliancy, especially including green shades obtained by mixture with neutral-drawing yellow dyes from other dyestuff classes.

Blended fiber materials contain besides the polyamide fibers, cellulosic fibers such as cotton, cellulose acetate including cellulose triacetate, polyethyleneglycol-terephthalate fiber or the like.

The new dyes according to this aspect of the invention are distinguished apart from fulfilling the requirements explained in the foregoing, by excellent level drawing property on the above-mentioned polyamide blended fibers, and by satisfactory to very good light fastness of the resulting dyeings on these fibers, even in green shades obtained by using the above-mentioned mixtures of the new dyes with suitable neutral-drawing yellow dyes.

Yellow dyes which draw from a neutral bath on the above-mentioned fibers and are particularly suitable for mixture with the neutral-drawing anthraquinone dyes according to the second aspect of the invention are those of the following classes: benzene-azo-pyrazolone dyes, benzene-azo-imino-pyrazole dyes, pyrazolone-azo-arylene-azo-pyrazolone dyes or imino-pyrazole-azo-arylene-azo-iminopyrazole dyes.

A first class of these new dyestuffs falls under the formula

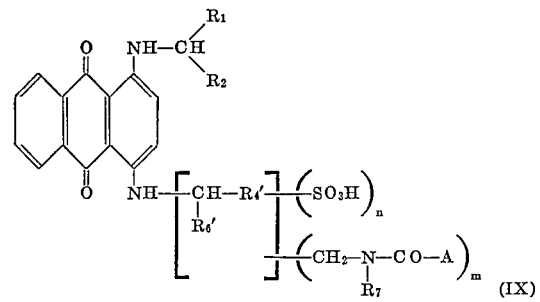

and a second class under the formula

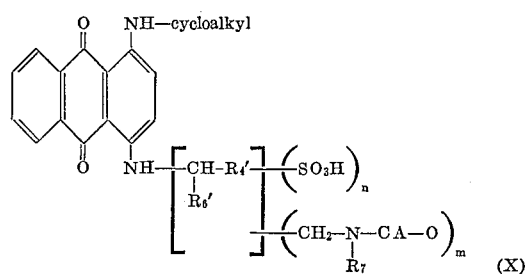

in which Formulas $R_1$, $R_2$ and $R_4'$ have the same meanings as in the preceding formulas, each of $m$ and $n$ are numbers ranging from about 1 to 2, $R_6'$ is a divalent alkylene, cycloalkylene or aralkylene radical, the latter being linked by its alkyl moiety to the

group in said formulas and being unsubstituted or ring-substituted by lower alkyl and/or lower alkoxy and/or by halogen, $R_7$ represents hydrogen or lower alkyl, "Cycloalkyl" means preferably the unsubstituted cyclopentyl or cyclohexyl group or a lower alkyl-substituted cyclopentyl or cyclohexyl group, and A represents an alkenyl group which can optionally contain at least one substituent which can be split off as ion, and which can be substituted, e.g., by lower alkyl and/or halogen, or it represents an alkyl group which contains at least one substituent which can be split off as ion and which can be substituted, e.g., by phenyl and/or halogen.

More in detail, in preferred subclasses of the dyestuffs falling under Formulas IX and X, $R_6'$ represents the same alkyl or cycloalkyl radical as represented by $R_6$ in Formula XIV, infra, or when $R_6$ represents aralkyl, the corresponding mono- or polyvalent aralkyl group, The radicals $R_4'$ and $R_6'$ together having a total of at least three and not more than five free bonds, and the number of aryl moieties in $R_4'$ and $R_6'$ counted together being preferably not more than two, and preferably one, $R_4'$ represents a mono- or polyvalent aralkyl radical preferably with one mononuclear carbocyclic, aryl moiety, which corresponds to the radical $R_4$ in Formula XIV, infra, and The groupings —$SO_3H$ and

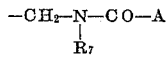

are each bonded to carbon atoms of the aryl nuclei in the aralkyl moieties $R_4'$ and/or $R_6'$.

The acid anthraquinone dyestuffs according to the invention are suitable for the dyeing and printing of synthetic polyamide fibers, primarily nylon, e.g., nylon 6 or nylon 66, or polyurethanes or, secondarily of natural polyamide such as silk, leather and, particularly, wool. They draw onto these fibers from a weakly acid to acid bath at higher temperature evenly and cover barriness of nylon very well. Compounds according to the invention of Formulas IX and X which contain two radicals —$CH_2$—$N(R_7)$—CO—A are advantageously dyed from a weakly acid bath in the presence of a dyeing auxiliary such as an addition product of about 5-20 mols of ethylene oxide to a fatty acid alkanolamide. Compounds of Formulas IX and X which contain only one radical —$CH_2$—$N(R_7)$—CO—A have particularly high drawing power from a neutral bath.

The blue dyeings obtained, particularly the wool dyeings, are distinguished by high brilliancy as well as by fastness to rubbing, good light fastness and good wet fastness properties, particularly fastness to washing, milling and sea water. In addition, the dyestuffs according to the invention are suitable for use in admixture with other acid dyestuffs to attain combination dyeings.

In some cases the new dyestuffs according to this aspect of the invention can be used for the dyeing of cellulose material, particularly cotton. Dyeing of this material is performed by the methods usual for reactive dyestuffs.

Particularly preferred among the dyestuffs of Formulas IX and X, on account of an optimal combination of the valuable dyeing properties outlined hereinbefore, are the dyestuffs of the formula

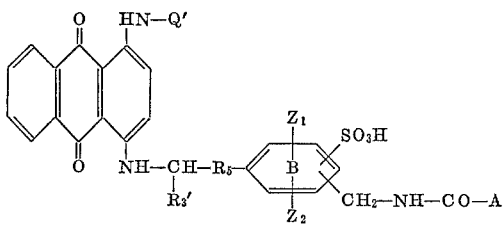

(XI)

wherein

Q' represents one of the radicals

cyclopentyl or cyclohexyl, each of $R_1$ and $R_2$ represents lower alkyl, $R_3'$ represents alkyl of from 1 to 2 carbon atoms, $R_5$ represents alkylene of from 1 to 2 carbon atoms, $Z_1$ represents hydrogen, methyl, methoxy, chlorine or bromine, $Z_2$ represents hydrogen, methyl, or methoxy, and $A_1$ represents —CCl=$CH_2$ or —$CH_2Cl$.

Another preferred subclass of dyestuffs according to the invention comprises the dyestuffs of the formula

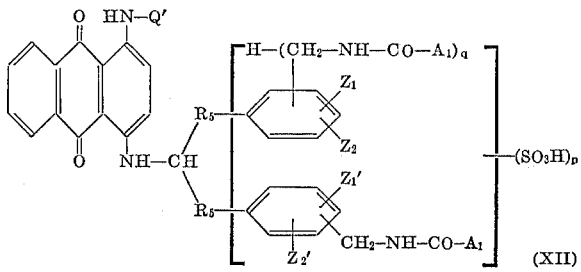

(XII)

wherein $A_1$, Q' and $R_5$ have the same meanings as in Formula XI, each of $Z_1$ and $Z_1'$ represents hydrogen, methyl, methoxy, chlorine or bromine, each of $Z_2$ and $Z_2'$ represents hydrogen, methyl or methoxy, p ranges from 1 to 2, and q represents 0 or 1, not more than one —$SO_3H$ group being linked to each of the two benzene nuclei.

The drawing power on nylon of the dyestuffs according to the invention, and particularly of those falling under Formulas XI and XII is particularly superior to that of the corresponding dyestuffs in which ring B is directly linked to the amino group in 4-position at the anthraquinone nucleus. The same applies to fastness of nylon dyeings obtained with the novel dyestuffs to rubbing and to milling.

Dyestuffs falling under Formulas XI and XII in which Q' represents the grouping

and particularly isopropyl, are particularly superior to the corresponding substituted last-mentioned known dyestuffs in that their dyeings on synthetic polyamide fibers, and especially on texturized nylon (e.g., Banlon) show superior fastness to rubbing, and their dyeings on staple rayon are particularly superior in fastness to perspiration, especially alkaline perspiration.

Dyestuffs falling under Formula XI in which Q' represents a cycloalkyl radical and especially cyclohexyl are superior to the correspondingly substituted last-mentioned known dyestuffs in that their dyeings on the above-mentioned polyamide fibers, especially on texturized nylon are faster to rubbing and show a better coverage of barriness.

The unsulfonated dyestuffs according to the invention, and particularly those corresponding to Formulas XI and XII but being free from sulfonic acid groups, are useful as disperse dyestuffs for the dyeing of polyamide fibers; the dyeings show good wet fastness properties.

Higher sulfonation, e.g., with one and a half, two or more sulfonic acid groups per mol of dyestuff according to Formula XII, leads to products of less satisfactory drawing power and unsatisfactorily low shade depth limit on polyamide fibers, especially on nylon. Wet fastness properties and coverage of barriness in nylon dyeings may also be adversely affected.

The dyestuffs according to this aspect of the invention, which fall under Formulas IX and X, are produced by reacting an anthraquinone compound of the formula

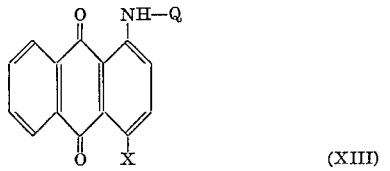
(XIII)

wherein Q represents a secondary alkyl or a cycloalkyl group and X has the same meaning as in Formula I with an aralkylamine containing at least two replaceable hydrogen atoms in the nucleus of the formula

(XIV)

wherein $R_4$ represents an aralkyl group optionally ring-substituted by lower alkyl or lower alkoxy groups or by halogen, and $R_6$ represents an alkyl group, a cycloalkyl group or an aralkyl group optionally ring-substituted by lower alkyl and/or lower alkoxy groups and/or by halogen, to form the corresponding 1-sec. alkylamino- or 1-cycloalkylamino-4-aralkylamino-anthraquinone and, in any order desired, reacting the latter with nmol of a sulfonating agent and with mmol of a compound introducing the radical of the formula

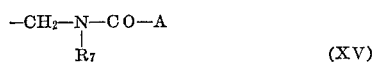
(XV)

wherein $R_7$ represents hydrogen or a lower alkyl group and A has the same meaning as in Formulas IX and X, to form an anthraquinone dyestuff of the average composition as defined in Formula IX or X, respectively.

If Q is a secondary alkyl group then this advantageously contains at most 6 carbon atoms and is, e.g., the isopropyl, sec. butyl or sec. isoamyl group. When Q is a cycloalkyl group it is preferably a mononuclear group such as the cyclopentyl or cyclohexyl group or homologues thereof, or it is a polynuclear non-condensed cycloalkyl group such as a dodecahydrodiphenyl group or a polynuclear condensed group such as decahydronaphthyl-(1)- or -(2)-group.

Advantageously Q represents the isopropyl, sec. butyl or cyclohexyl group.

Aralkyl groups in the position of $R_4$ and $R_6$ are above all α-arylalkyl or β-arylalkyl groups, the aryl ring preferably being mononuclear. Examples thereof are the benzyl or phenethyl group. The aralkyl radicals in the positions of $R_4$ and $R_6$ can also contain two benzene nuclei. In this case they are, e.g., radicals of a β,β-diphenylethane. If the aryl rings of the aralkyl groups are substituted by low alkyl or alkoxy groups then these groups advantageously are, for instance, the methyl or ethyl group and the methoxy or ethoxy group, respectively; if they are substituted by halogen then this is for example fluorine, bromine or especially chlorine. The aliphatic part of the aralkyl radical can be straight or branched chained.

As alkyl group, $R_6$ is for example the methyl, ethyl or isobutyl group. When $R_6$ is a cycloalkyl group, it is preferably the cyclohexyl group.

In preferred aralkylamines of Formula XIV, $R_4$ is a phenylalkyl radical, especially the benzyl or phenethyl radical, and $R_6$ is a low alkyl group, preferably the methyl group. X in Formula XIII represents, e.g., chlorine, bromine, the hydroxyl group, low alkoxy groups such as the methoxy group, or the nitro or amino group. However, X is preferably chlorine or bromine.

If $R_7$ is a low alkyl group then it is advantageously a methyl or ethyl group; more preferably, however, $R_7$ is hydrogen.

When A is an alkenyl group, it advantageously has 2 or 3 carbon atoms and not more than one double bond and is, e.g., a vinyl, propenyl, isopropenyl or allyl radical. If A is an alkyl group then it preferably contains 1 to 4 carbon atoms.

The substituents which can be split off as ion may be split off as anion or cation. Examples of the former are halogens such as chlorine or bromine, an alcoholic hydroxyl group esterified with sulphuric acid or with aliphatic or aromatic sulphonic acid, or the groups R—O—, R—S— and R—SO$_2$, wherein R is an organic radical such as an aliphatic or aromatic hydrocarbon radical. Examples of groups which can be split off as cation are quaternary ammonium groups such as the trimethyl ammonium group, the group

or

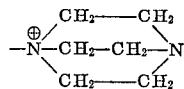

Preferably A contains a halogen atom in the α-position to the —CO— group and it is for example the chloromethyl, bromomethyl, α-chlorovinyl or α-bromovinyl group.

There can be one or more groups present in the radical A which can be split off as anion or cation.

When the alkyl groups are further substituted and the alkenyl groups are substituted or further substituted, they contain, e.g., a hydroxyl, carboxyl or aryl group, in the latter case preferably the phenyl group.

Examples of A are:

—CH=CH$_2$
—CH=CH—CH$_3$
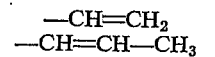
—CH=CH—COOH
—CH=CH—Hal
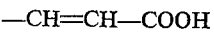
—CH$_2$—Hal
—CH$_2$—CH$_2$—Hal

—CH$_2$—CH$_2$—O—R'
—CH$_2$—CH$_2$—O—Ar
—CH$_2$—CH$_2$—S—R'
—CH$_2$—CH$_2$—S—CH$_2$—COOH
—CH$_2$—CH$_2$—S—Ar
—CH$_2$—CH$_2$—O—SO$_3$H
—CH$_2$—CH$_2$—O—SO$_2$—Ar

—CH₂—CH₂—SO₂—Ar

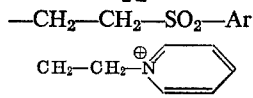

In the above, Hal represents chlorine or bromine, R' represents an alkyl group and Ar an aryl group.

In preferred compounds introducing the radical of Formula XV, A is the chloromethyl or the α-chlorovinyl group and R₇ is hydrogen.

Starting materials of Formula XIII are obtained by known processes, e.g., by chlorinating or brominating or nitrating the corresponding 1-sec. alkylamino- or 1-cycloalkylamino-anthraquinone compounds and, if desired, exchanging the chlorine or bromine for the hydroxyl or a low alkoxy group, or reducing the nitro group to the amino group. Starting compounds of Formula XII wherein X is the hydroxyl group can also be obtained by reacting 1,4-dihydroxyanthraquinone or its leuco compound or a mixture thereof with the corresponding sec. alkylamine or cycloalkylamine. They can be used direct for reaction with the aralkylamine of Formula XIV without isolation.

The aralkylamines of Formula XIV are obtained, according to R. Leuckart, Ber. 18, 2341 (1885) for example, by reacting ketones of the formula

with ammonium formate or formamide and then splitting off the formyl group. In some cases, they can be obtained according to G. Mignonac C.r. 172, 223 (1921) by converting an arylidene ketone into the saturated amine with ammonia and hydrogen in the presence of a catalyst.

Examples of compounds which can be used to introduce the radical of Formula XV are the N-methylolamides or N-(chloromethyl)- or N-(bromomethyl)-amides of corresponding carboxylic acids of the formula

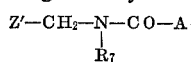

wherein Z' represents the hydroxyl group or chlorine or bromine.

The N-methylolamides are obtained, e.g., by adding formaldehyde to the corresponding carboxylic acid amides in the presence of basic condensing agents such as potassium carbonate, or also by reaction with mineral acid under mild conditions, and the N-(chloromethyl)- or N-(bromomethyl)-amides are obtained by reacting the methylolamides mentioned above with, e.g., thionyl chloride or thionyl bromide. Insead of the N-methylolamides or N-(halogenomethyl)-amides, also other reactive functional derivatives which react in the same way can be used, e.g., other esters of the methylol compounds with inorganic acids. Also the di-(carboxylic acid amidomethyl)-ethers obtained by condensation of the methylolamides in the presence of, e.g., phosphorus oxychloride, can be used. However, as these functional derivatives often have to be produced from the corresponding methylol compounds, the latter are preferred.

The reaction of the anthraquinone compound of Formula XIII with the aralkylamine of Formula XIV is performed, e.g., in solution or in the melt of an excess of aralkylamine as defined or in an organic solvent not taking part in the reaction. Preferable solvents for this purpose are, e.g., aromatic hydrocarbons such as toluene, xylenes or naphthalene; or halogenated or nitrated aromatic hydrocarbons such as chlorobenzene, di- and trichlorobenzene or nitrobenzene; or halogenated aliphatic hydrocarbons such as trichloroethylene; alcohols, e.g., alkanols such as n-butanol, sec. butanol or alkylene glycol monoalkyl ethers, e.g., ethylene glycol monomethyl or monoethyl ether; aromatic hydroxyl compounds, e.g., phenol and its homologues; or tertiary nitrogen bases such as pyridine.

If, as starting material, an anthraquinone compound of Formula XIII is used wherein X is halogen, especially chlorine or bromine, the reaction is advantageously performed in the presence of copper or a copper compound such as cuprous chloride and in the presence of an acid buffering agent and preferably at a raised temperature.

As acid buffering agent, advantageously an excess of the aralkylamine as defined is used, optionally together with an alkali metal salt of a fatty acid such as sodium or potassium acetate or of carbonic acid, such as sodium bicarbonate or sodium carbonate, or with an alkali metal hydroxide such as sodium or potassium hydroxide, or with magnesium oxide. In some cases, a tertiary amine such as triisopropanol-amine can be used as buffering agent.

The reaction of the 1-sec. alkylamino- or 1-cycloalkylamino-4-aralkylamino-anthraquinone compound with the compound introducing the radical of Formula XV is performed advantageously in the presence of acid condensing agents or agents splitting off water which react as such condensing agents. Examples of such condensing agents are concentrated hydrochloric acid, zinc chloride, phosphorous pentoxide, acetic acid anhydride, syrupy phosphoric acid and oleum. The preferred condensing agent, however, is 90% to anhydrous sulphuric acid. The reaction temperature can fluctuate within wide limits and depends mainly on the condensing agent used. In concentrated sulphuric acid, the reaction generally proceeds quickly and completely even at room temperature; in some cases a slightly raised temperature is necessary. The finished reaction products are precipitated, for instance, by pouring the sulphuric acid solutions or suspensions into ice water and they are converted into the water soluble alkali metal salts in the usual way and these are isolated.

In some cases, instead of the aforesaid N-methylolamides or N-halogenomethylamides a mixture of α,α'-dichloro- or α,α'-dibromo-dimethyl ether with the corresponding carboxylic acid amides or with carboxylic acid nitriles, such as acrylonitrile or a halogen acrylonitrile can be used as compounds introducing the radical of Formula XV. In this case too, the reaction is advantageously performed in concentrated sulphuric acid. (This method of performing the process according to the invention is described, for example, in the following Belgian Patent Nos. 630,205, 625,916, 628,442, 608,932, 613,037, 603,420, and 612,417).

The sulphonation is performed by usual methods, for instance, in concentrated sulphuric acid or in oleum under mild conditions, e.g., at room temperature, or with chlorosulphonic acid in a solvent which is inert under the reaction conditions.

In a preferred method, sulfonation is carried out with oleum having an SO₃- content of at least 3% but not more than about 10% by weight, preferably, however about 6 to 7%, at room temperature (15 to 35° C.). The degree of sulfonation attained is controlled by testing the solubility of samples or under known methods which have been mentioned under the first aspect of the invention.

Isolation and identification of isomers constituting the dyestuffs of the invention could be achieved by the methods described under the first aspect of the invention, but they are of no practical value for the same reasons as stated thereunder.

A technically particularly simple and, therefore, preferred method consists in the condensation of the 1-sec. alkylamino- or 1-cycloalkylamino-4-aralkylaminoanthraquinone compound with the compound introducing the radical of Formula XV or precursors thereof and sulfonation of the condensation product obtained without isolation of the intermediate product. This condensation is performed in concentrated sulfuric acid whereupon the condensation product obtained is sulfonated in sulfuric acid solution.

The two operations last mentioned are advantageously so arranged that not more than one radical of Formula XIV and one sulfonic acid group are introduced per aralkyl radical having at least two replaceable hydrogen atoms in the nucleus.

A first modification of the process according to this aspect of the invention consists in reacting an anthraquinone compound of formula

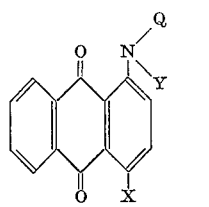
(XVI)

wherein Y represents an acyl radical and Q and X have the meanings given above, with an aralkylamine, having at least two replaceable hydrogen atoms in the nucleus, of Formula XIV to form the corresponding 1-(N-sec. alkyl-N - acylamino)- or 1 - (N - cycloalkyl-N-acylamino)-4-aralkylamino-anthraquinone compound and, in any order desired, saponifying this into the corresponding 1-sec. alkylamino- or 1-cycloalkylamino-4-aralkylamino-anthraquinone compound and reacting with nmol of a sulfonating agent and mmol of a compound introducing the radical of Formula XV to form an anthraquinone dyestuff mixture of the average composition of Formula IX or X, respectively.

Y represents, e.g., a carbacyl radical, particularly an alkanoyl radical, e.g., the formyl, acetyl or propionyl radical, or an aroyl radical such as the benzoyl radical, or an alkylsulfonyl radical such as the methylsulfonyl radical, or an arylsulfonyl radical such as the phenylsulfonyl or p-methylphenyl sulfonyl radical. Preferably Y is the acetyl radical.

The 1-acylamino-anthraquinones of Formula XVI are obtained by known methods, e.g., by reacting an anthraquinone compound of Formula XIII with an acylating agent introducing the radical Y, mainly with acetyl chloride or bromide or acetoanhydride.

The reaction of the 1-acylamino-anthraquinone compound of Formula XVI with the aralkylamine of Formula XIV is performed as described in the first process. Preferably, the 1-(N-sec. alkyl-N-acylamino)- or 1-(N-cycloalkyl - N-acylamino)-4-aralkylamino-anthraquinone compound is first saponified, then reacted with the compound introducing the radical of Formula XV and finally sulfonated. Saponification is performed advantageously in aqueous acid medium, e.g., in aqueous sulfuric acid and, advantageously, at a raised temperature. The reaction with the compound introducing the radical of Formula XV and the sulfonation are performed as described in the first process of this aspect of the invention.

The quantitative reaction of an acylamino-anthraquinone compound of Formula XVI with an aralkylamine of Formula XIV and the subsequent quantitative saponification of the acyl radical are unexpected, as normally when arylamines are used instead of aralkylamines, insufficient yields are obtained on splitting off the acyl radical.

A second modification of the process according to this aspect of the invention consists in reacting an anthraquinone compound having in the aryl moiety of

preferably of $R_4$, at least two exchangeable hydrogen atoms, of formula

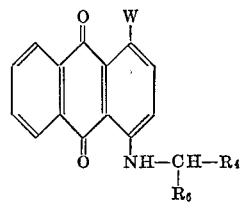
(XVII)

wherein W represents a substituent which can be exchanged for a (sec. alkyl)-amino or cycloalkylamino group and $R_4$ and $R_6$ have the meanings given in Formula XIV, with a (sec. alkyl)-amine or a cycloalkylamine of formula $$Q-NH_2 \qquad (XVIII)$$

wherein Q has the meaning given in Formula XIII, to form the corresponding 1-sec. alkylamino- or 1-cycloalkylamino-4-aralkylamino-anthraquinone compound and, in any order desired, reacting this with nmol of a sulphonating agent and mmol of a compound introducing the radical of Formula XV to form an anthraquinone dyestuff mixture of the average composition of Formula IX or X, respectively.

W represents, like X in the first process, e.g., the hydroxyl or a low alkoxy group such as the methoxy group or the amino or nitro group, or especially chlorine or bromine.

The starting materials of Formula XVII are known or can be produced by known methods, e.g., by reacting a 1-chloro- or 1-bromo- or 1-nitro-4-low-alkoxy-anthraquinone with an aralkylamine of Formula XIV, and, if desired, converting the chlorine or bromine into a low alkoxy group or reducing the nitro group to the amino group.

Starting compounds wherein W is the hydroxyl group can be produced by reacting 1,4-dihydroxy-anthraquinone or its leuco compound or a mixture thereof with an aralkylamine of Formula XIV. They can be used direct without isolation for the condensation with the (sec. alkyl)-amine or cycloalkylamine of Formula XVIII.

The reaction of the compound of Formula XVII with the (sec. alkyl)-amine or cycloalkylamine of Formula XVIII to form the corresponding 1-sec. alkylamino- or 1-cycloalkylamino-4-aralkylamino-anthraquinone and the condensation of the latter with the compound introducing the radical of Formula XV and the sulphonation to form the end product of Formula IX or X are performed analogously to the descriptions given in the first process of this aspect of the invention.

A third modification of the process according to this aspect consists in reacting an anthraquinone compound, containing in the aryl moiety of

preferably of $R_4$, at least two exchangeable hydrogen atoms, of formula

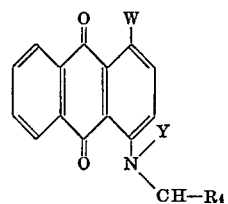
(XIX)

wherein Y has the meaning given in Formula XVI, W has that given in Formula XVII and $R_4$ and $R_6$ have the meanings given in Formula XIV with a (sec. alkyl)-amine or a cycloalkylamine of Formula XVIII to form the corresponding 1-sec. alkylamino- or 1-cycloalkyl-amino-4-

(N-aralkyl-N-acylamino)-anthraquinone compound and, in any order desired, saponifying and reacting this with nmol of a sulfonating agent and mmol of a compound introducing the radical of Formula XV to form an anthraquinone dyestuff mixture of the average composition of Formula IX or X, respectively.

The starting materials of Formula XIX are obtained by known methods, e.g., by reacting an anthraquinone compound of Formula XVII with an acylating agent introducing the radical Y, preferably with acetyl chloride or bromide or with acetoanhydride.

The reaction of the acylamino-anthraquinone compound of Formula XIX with the (sec. alkyl)-amine or cycloalkylamine of Formula XVIII and the saponification of the 1-sec. alkylamino- or 1-cycloalkylamino-4-(N-aralkyl-N-acylamino)-anthraquinone compound as well as the sulfonation and reaction with the compound introducing the radical of Formula XV are performed as described in the first process of this aspect of the invention.

The end products of Formulas IX and X are isolated preferably in the form of alkali metal salts, more preferably as sodium salts. They are very soluble in water.

The following non-limitative examples illustrate this aspect of the invention. The temperatures are given therein in degrees centigrade. Where not otherwise stated, parts and percentages are given by weight.

Example 1

(I) (a) (1) A mixture of 19 g. of 1-cyclohexylamino-4-bromoanthraquinone, 19 g. of 1-phenyl-3-aminobutane, 5 g. of anhydrous potassium acetate, 0.005 g. of cuprous chloride, 10 ml. of n-butanol and 0.10 ml. of water is stirred for 48 hours at a temperature of 100°. 30 ml. of methanol are then added to the reaction mixture through a dropping funnel after which the temperature is kept for 30 minutes at 50° whereupon 50 ml. of isopropanol are also added to the reaction mixture. After cooling to room temperature, the precipitated product is filtered off and purified by recrystallization from n-butanol whereupon the compound of the formula

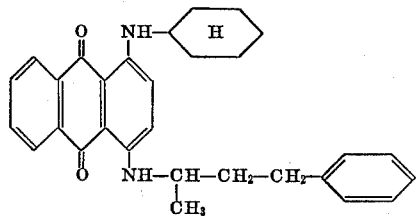

is obtained, M.P. 145°.

If instead of 1-cyclohexylamino-4-bromoanthraquinone, equivalent amounts of the 1-cycloalkylamino-4-halogeno-anthraquinones given in the following Table 1 are used (produced by halogenating the corresponding 1-cycloalkylaminoanthraquinones with bromine in glacial acetic acid or with sulphuryl chloride in nitrobenzene), then with otherwise the same procedure, similar end products are obtained.

TABLE 1

(b)

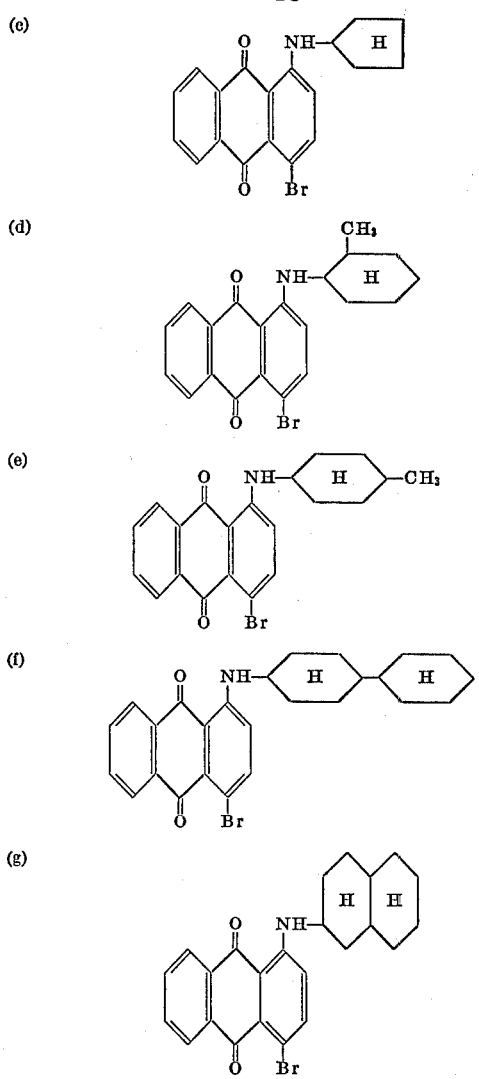

Other similar products are obtained if in the above Example 1(a) instead of 1-phenyl-3-aminobutane, equivalent amounts of the aralkylamines given in the following Table 2 are used and otherwise the procedure is the same as given in Example 1(a).

Reference to a preceding example, here and hereinafter, is to the identified example set forth in connection with the second aspect of this invention.

Other similar products are obtained if in the above Example 1(a) instead of 1-phenyl-3-aminobutane, equivalent amounts of the aralkylamines given in the following Table 2 are used and otherwise the procedure is the same as given in Example 1(a).

TABLE 2

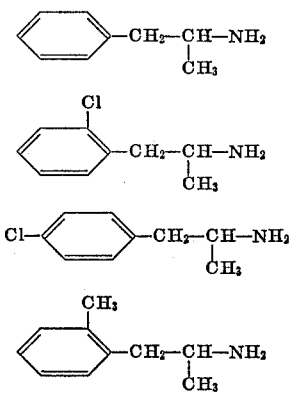

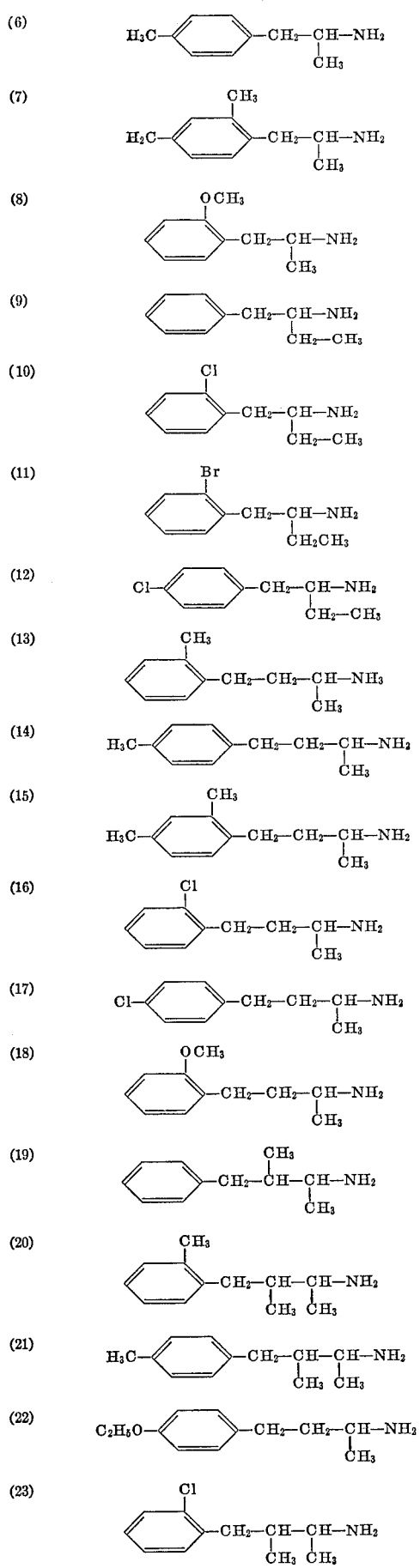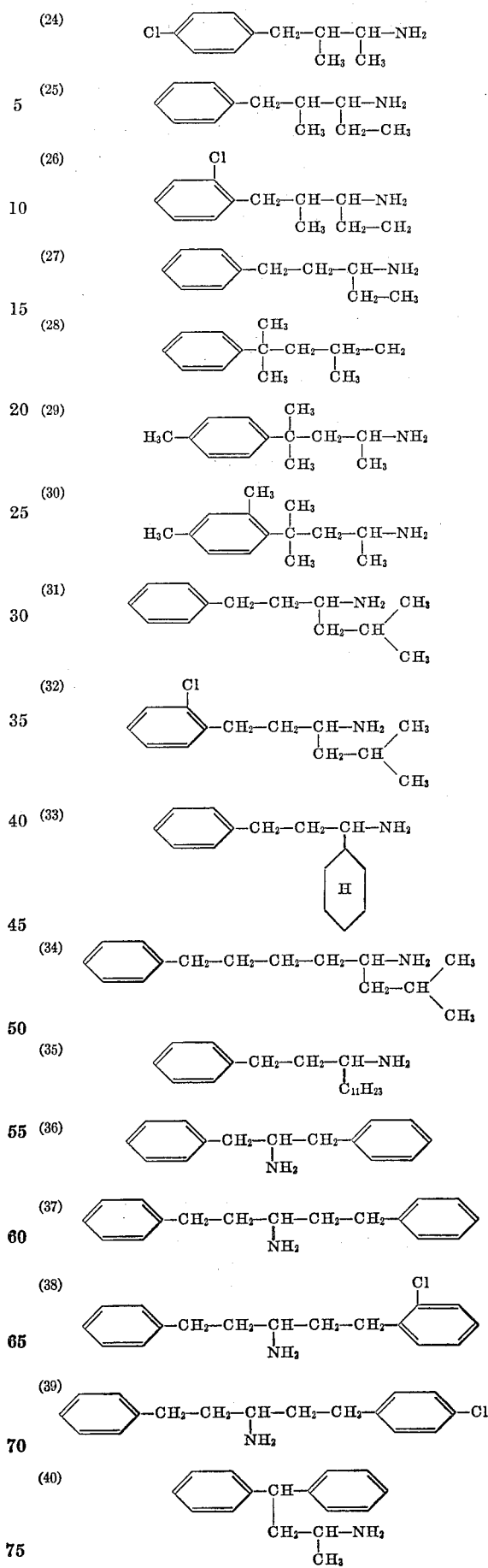

(41) 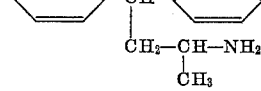

(42) 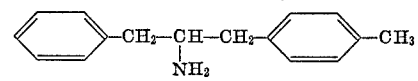

(43) 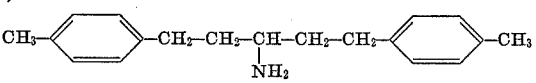

(44) 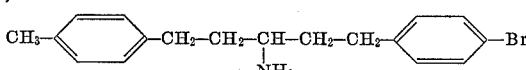

(45) 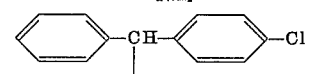

(46) 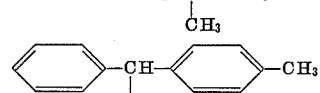

(II) 45.2 g. of the compound of the formula

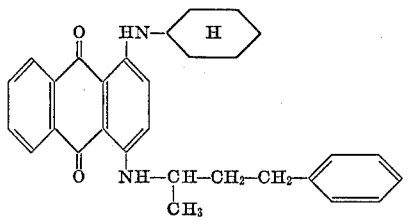

are added in portions to 13.7 g. of N-methylol chloracetamide until a homogeneous mixture is attained, the mixture is added to 500 g. of 90% sulphuric acid at a temperature of 5–10° and the solution obtained is stirred for 24 hours at this temperature. The mixture is then poured onto ice, the precipitated condensation product is filtered off, washed neutral with water and dried at 60° in vacuo. It is sulphonated by adding the product to 10 times its amount by weight, of 6% oleum at 23–25° and stirring the mixture for 18 hours. The solution is then poured onto ice, the precipitated dyestuff is filtered off and washed with aqueous 10% sodium chloride solution. The precipitate is slurried in water and the pH of the slurry is adjusted to 7 by the careful addition of dilute sodium hydroxide solution. The dyestuff is then precipitated by the addition of sodium chloride and is filtered off and dried at 60° in vacuo. The dyestuff is obtained as a blue powder which dissolves easily in water with a blue color.

The dyestuff dyes nylon and wool from a neutral to weakly acid bath in very brilliant blue shades. The dyeings are very level and have good fastness to light and excellent wet fastness.

If instead of the 1-cyclohexylamino-4-aralkylamino-anthraquinone compound of the above formula, an equivalent amount is used of one of the anthraquinone compounds given above, which is obtained (according to Example 1(a)) by reacting each of the 1-cycloalkylamino-4-halogeno-anthraquinones listed in Table 1 with 1-phenyl-3-amino-butane or each of the aralkylamines which are listed in Table 2, and otherwise the procedure given in Example 1 (II) is followed, then dyestuffs having a similar good dyeing properties are obtained.

Dyestuffs having similar valuable properties are also obtained if, in each of the examples described above, instead of the 13.7 parts of N-methylol chloracetamide, an equivalent amount of the N-methylol compound of one of the amides given in the following Table 3 is used.

TABLE 3

(α)    Br—CH$_2$—CONH$_2$ (β)    Cl—CH$_2$—CO—NH
                     |
                     CH$_3$ (γ)    Br—CH$_2$—CO—NH
                     |
                     C$_2$H$_5$ (δ)    Cl—CH$_2$—CH—CONH$_2$
                    |
                    Cl (ε)    Cl—CH$_2$—CH$_2$—CONH$_2$ (ζ)    Br—CH$_2$—CH$_2$—CONH$_2$ (η)    H$_2$C=C—CONH$_2$
            |
           Cl (ϑ)    H$_2$C=C—CONH$_2$
            |
           Br (ι)    Cl—CH=CH—CONH$_2$ (κ)    H$_2$C=CH—CONH$_2$ (λ)    H$_2$C=C—CONH$_2$
            |
           CH$_3$ (μ)    Cl\
               C=C—CONH$_2$
           Cl/  |
                  Cl (ν)    HO—CH$_2$—CONH$_2$*

(ξ)    H$_3$C—C=CH—CONH$_2$
             |
           Cl (ο)    H$_3$C—CH=C—CONH$_2$
                |
             Cl (π)    HOOC—CH=C—CONH$_2$
                |
             Cl (ρ)    HOOC—C=CH—CONH$_2$
             |
           Cl (σ)    C$_6$H$_5$—CH—CH—CH$_2$—CONH$_2$
                   |   |
                  Br  Br (τ)    C$_6$H$_5$—CH—CONH$_2$*
                 |
              OH

*In the sulphonation, the hydroxyl group is sulphated.

Example 2

(I)(a)(1) A mixture consisting of 19.3 g. of 1-(N-acetyl-N-isopropyl-amino)-4 - bromoanthraquinone and 16.2 g. of 1-phenyl-3-aminobutane is stirred for 20 hours at a temperature of 110°. The red melt obtained is then poured into a mixture of 200 g. of ice and 200 ml. of 2 N HCl whereupon the compound of the formula

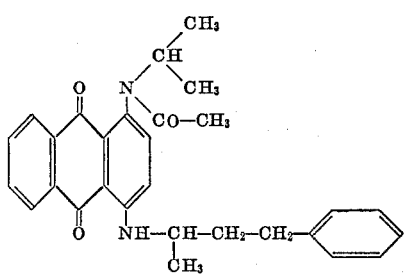

precipitates as a red resin. The aqueous hydrochloric acid phase is decanted and the product of the above formula is dissolved in 100 ml. of 80% sulphuric acid. This solution is stirred for 8 hours at a temperature of 50° and then poured onto ice whereupon the unsulfonated dyestuff of the formula

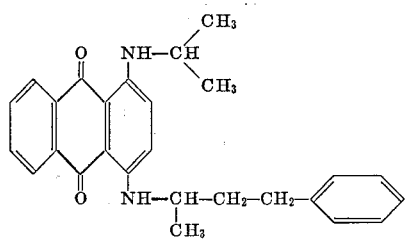

precipitates. It is separated by suction filtration and then purified by recrystallization from n-butanol.

If with otherwise the same procedure, there is used, instead of 1-(N-acetyl-N-isopropylamine)-4-bromoanthraquinone, an equivalent amount of each of the 1-(N-acetyl-N-sec-alkylamino)-4-halogeno - anthraquinones, respectively, given in the following Table 4 and 16.2 g. of 1-phenyl-3-aminobutane or an equivalent amount of each of the aralkylamines (2) to (46), respectively, which aralkylamines are listed in the above Table 2, then similar valuable dyestuffs are obtained.

TABLE 4

(h) 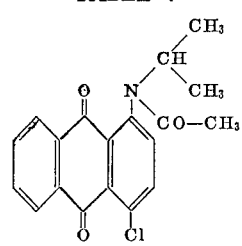

(i) 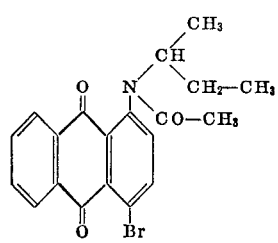

(j) 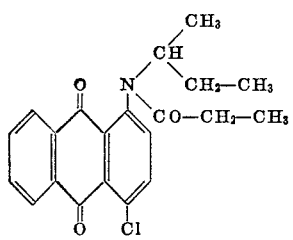

(k) 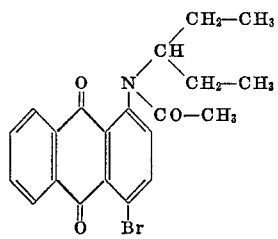

(l) 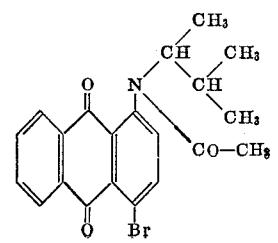

(m) 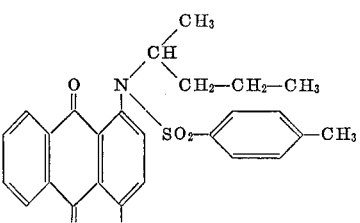

(n) 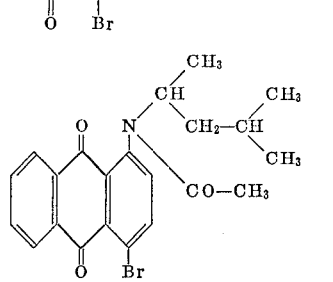

(o) 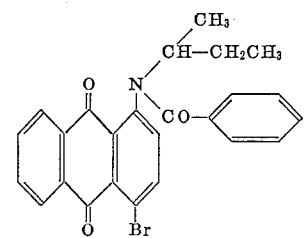

(p) 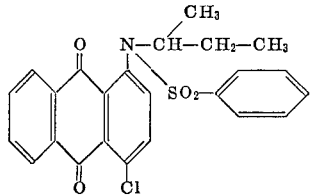

(q) 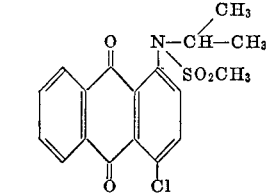

(II) A homogeneous mixture of 41.2 g. of the compound of the formula

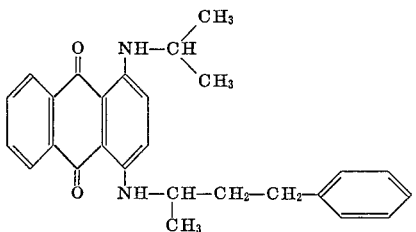

and 13.7 g. of N-methylol chloracetamide is added to 300 g. of 96% sulfuric acid at 0–5° and the solution obtained is stirred for 24 hours at this temperature. The temperature is then raised to 23° and 130 g. of 66% oleum are added gradually. The solution is stirred for another 6 huors at 23–25° and then poured onto ice. The product is worked up analogously to the procedure described in Example 1 (II).

A dyestuff is obtained which dyes nylon and wool from a neutral to weakly acid bath in very brilliant blue shades. The dyeings are very level, have good fastness to light and, at the same time, excellent wet fastness properties.

If with otherwise the same procedure, instead of the compound of the above formula, an equivalent amount of each of the compounds obtained by condensation of the 1-(N-acetyl-N-sec. alkylamino)-4-halogeno-anthraquinones listed in Table 4 with 1-phenyl-3-amino-butane or the aralkylamines listed in Table 2 is used, then dyestuffs having similar properties are obtained.

Dyestuffs with similar properties are also obtained if, with the procedure given above, the N-methylol compound of each of the amides (α) to (τ), respectively, given in Table 3 is used instead of N-methylol chloracetamide.

Example 3

13.7 g. of α-chloracrylonitrile and 0.1 g. of hydroquinone are dissolved in 65 g. of 93% sulphuric acid at 20°, this solution is stirred for 3 hours at a temperature of 33–35°, cooled to 10–12°, 7.5 g. of α,α'-dichlorodimethyl ether are added, dropwise within 1 hour and the mixture is stirred first for 3 hours at 10–12° and then for 4 hours at 13–15°.

350 g. of 90% sulphuric acid are then added to this solution after which 41 g. of the compound of the formula

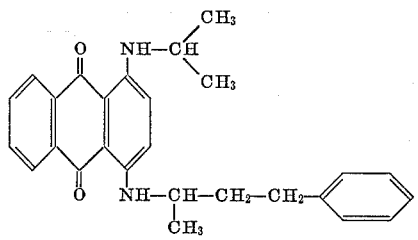

are added at a temperature of 5–10° C. The mixture is stirred for 24 hours at this temperature, then poured onto ice and the condensation product is filtered off, washed neutral with water and then dried in vacuo at 60° C. It is sulphonated in 6% oleum for 6 hours at 23–25° as described in Example 1. The dyestuff so obtained dyes nylon and wool from a weakly acid to neutral bath in level, brilliant blue shades; the dyeings have good light fastness and good wet fastness properties, especially good wash fastness.

If instead of the compound of the above formula, an equivalent amount of each of the compounds obtained, respectively, by reacting each of the 4-halogeno-anthraquinones (a) to (q) listed in Tables 1 and 4 with 1-phenyl-3-aminobutane or each of the phenylalkylamines (1) to (46), respectively, listed in Table 2 is used with otherwise the same procedure, then dyestuffs having similar valuable properties are obtained.

Dyestuffs having similar properties are also obtained if, with otherwise the same procedure, instead of α-chloroacrylonitrile, an equivalent amount of each of the nitriles, respectively, given in the following Table 5 or the corresponding carboxylic acid amides are used.

TABLE 5

(i)             Cl—CH$_2$—CN
(ii)            Br—CH$_2$—CN
(iii)           Cl—CH$_2$—CH$_2$—CN
(iv)           Cl—CH$_2$—CH(Cl)—CN
(v)            Cl—CH=CH—CN
(vi)           H$_3$C—C(Cl)=CH—CN
(vii)          H$_3$C—CH=C(Cl)—CN
(viii)        Cl$_2$C=C(Cl)—CN
(ix)           H$_3$C—O—CH$_2$—CH$_2$—CN
(x)            C$_6$H$_5$—O—CH$_2$—CH$_2$—CN

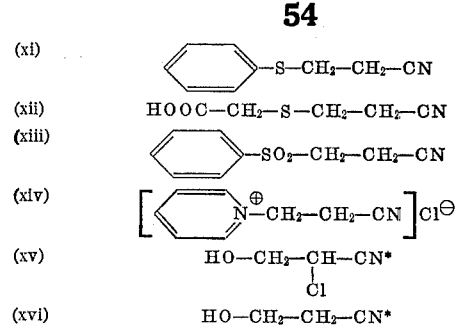

(xi)    C$_6$H$_5$—S—CH$_2$—CH$_2$—CN
(xii)   HOOC—CH$_2$—S—CH$_2$—CH$_2$—CN
(xiii)   C$_6$H$_5$—SO$_2$—CH$_2$—CH$_2$—CN
(xiv)   [C$_5$H$_5$N$^\oplus$—CH$_2$—CH$_2$—CN] Cl$^\ominus$
(xv)    HO—CH$_2$—CH(Cl)—CN*
(xvi)   HO—CH$_2$—CH$_2$—CN*

*In the sulphonation, the hydroxyl groups are sulphated.

Example 4

A mixture of 12 g. of 1-(N-sec. butylamino)-4-hydroxy-anthraquinone (obtained by reacting sec. butylamine with leuco-1,4-dihydroxy-anthraquinone), 18 g. of 1-phenyl-3-aminobutane, 40 g. of phenol and 9 g. of zinc dust is stirred for 18 hours at a temperature of 90°. 2 N-hydrochloric acid is then added to the reaction mixture until the reaction is strongly acid and the phenol is removed by steam distillation. The precipitated reaction product is filtered off and washed first with 2 N hydrochloric acid and then with water and dried whereupon a blue powder is obtained. By chromatography on an alumina column followed by recrystallization from butanol, the pure product of the formula

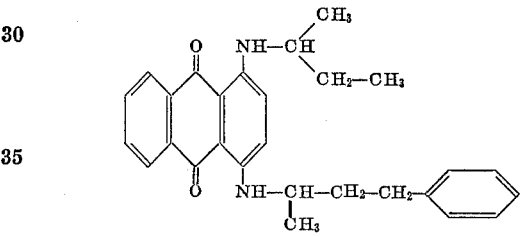

is obtained, M.P. 104°.

If instead of the 1-(N-sec. butylamino)-4-hydroxy-anthraquinone, the equivalent amount of 1-(N-sec. butylamino)-4-anthraquinone (obtained from 1-(N-sec. butylamino)-4-nitroanthraquinone by reduction) is used, then with otherwise the same procedure, the anthraquinone compound of the above formula is also obtained.

A homogeneous mixture of 42.6 g. of this anthraquinone compound and 13.7 g. of N-methylol chloracetamide is added to 450 g. of 90% sulphuric acid at a temperature of 5–10° and the solution obtained is stirred for 24 hours at this temperature whereupon the mixture is poured onto ice. Further work up of the product and sulfonation are performed as described in Example 1. The blue dyeings attained on wool and nylon with this dyestuff are very level and have good light and wet fastness properties.

Example 5

A mixture of 30 g. of 1-(N-isopropylamino)-4-methoxy-anthraquinone (obtained by methylation of 1-(N-isopropylamino)-4-hydroxy-anthraquinone) and 50 g. of 1-phenyl-2-methyl-3-aminobutane is stirred for 24 hours at a temperature of 150°. After cooling, the mixture is diluted with 250 ml. of methanol, the precipitated product is filtered off and washed with methanol and recrystallised from n-butanol. The compound of the formula

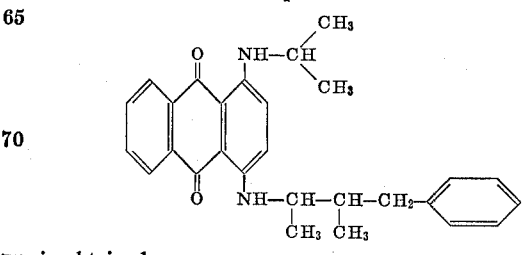

is obtained.

If with otherwise the same procedure, instead of 1-(N-isoproplyamino)-4-methoxy-anthraquinone, an equivalent amount of 1-(N-isopropylamino)-4-nitro-anthraquinone (obtained by reaction of 1-methoxy-4-nitro-anthraquinone with isopropylamine) is used then the anthraquinone compound of the above formula is obtained.

42.6 g. of this anthraquinone compound of the above formula are added to 90% sulfuric acid and condsensed therein at 5–10° with 13.7 g. of N-methylol chloracetamide by the procedure described in Example 1 (II) and the condensation product is sulfonate at 25° in 6% oleum for 18 hours. The dyestuff so obtained dyes nylon and wool from a weakly acid to neutral bath in brilliant blue shades. The dyeings have good wet and light fastness.

Example 6

(I) a mixture consisting of 39 g. of the compound of the formula

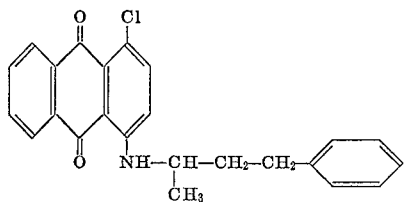

(obtained by reacting 1-chloro-4-methoxy-anthraquinone with 1-phenyl-3-aminobutane), 30 g. of 3-aminopentane, 10 g. of technical anhydrous potassium acetate, 0.010 g. of cuprous chloride, 0.30 ml. of water and 50 ml. of n-butanol is stirred in an autoclave for 48 hours at a temperature of 120°. After cooling, 200 ml. of methanol are slowly poured into the mixture while stirring whereupon the product formed precipitates. This is filtered off, washed with methanol, then with hot 2 N hydrochloric acid, and finally with water, and dried. On recrystallising from n-butanol, the compound of the formula

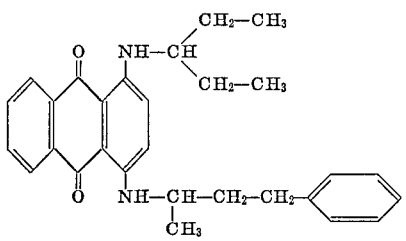

is obtained.

(II) 44 g. of this anthraquinone compound is condensed as described in Example 1 with 13.7 g. of N-methlol chloracetamide in 90% sulfuric acid, and then sulfonated at 25° in 6% oleum for 18 hours. The blue dyeings obtained with this dyestuff on nylon and wool have good wet and light fastness.

If in step (I), instead of the 1-chloro-4-aralkylamino-anthraquinone compound there mentioned, an equivalent amount of the corresponding 1-bromo-anthraquinone is used, then, with otherwise the same procedure, the same end product is obtained.

Example 7

(I) A mixture of 54 g. of the compound of the formula

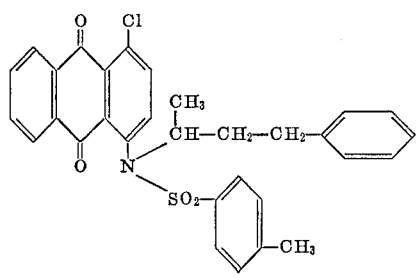

(obtained by reacting the corresponding 1-chloro-4-aralkylaminoanthraquinone compounds with p-toluene sulphochloride), 30 g. of 2-amino-3-methylbutane and 100 ml. of n-butanol is stirred in an autoclave for 24 hours at a temperature of 110° whereupon the reaction mixture is steam-distilled. The residue, a red resin, is added to 600 g. of 80% sulphuric acid and the solution is stirred for 10 hours at a temperature of 60° whereby the tosyl radical is split off. The solution is poured onto ice, the precipitated product is filtered off and then crystallised from n-butanol. The unsulfonated dyestuff obtained has the formula

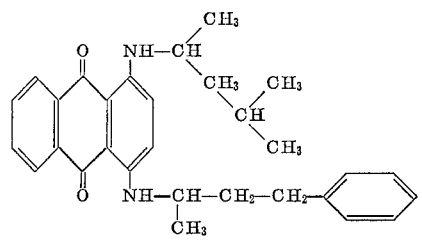

If, with otherwise the same procedure, instead of the above 1-chloro-4-(N-aralkyl-N-p-tolylsulfonylamino)-anthraquinone compound, an equivalent amount of each of the 1-halogeno-4-(N-acyl-N-aralkylamino)-anthraquinonoes, respectively, given in the following Table 6 with 30 g. of 2-amino-3-methylbutane is used, then the 1-sec. alkylamino-4-aralkylamino-anthraquinone of the above formula is also obtained.

TABLE 6

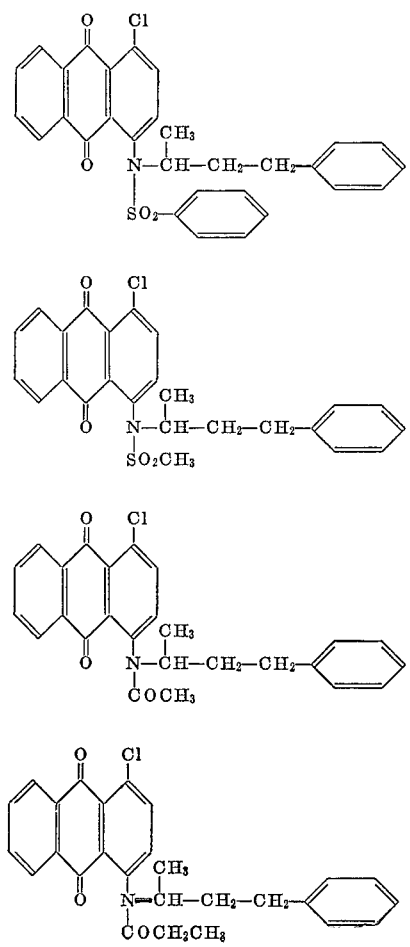

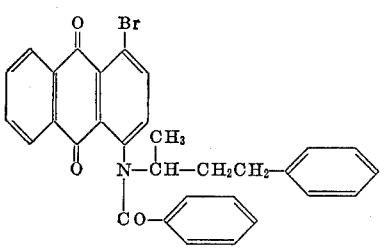

(II) 44 g. of the unsulfonated dyestuff of the above given formula obtained under (I) in this example are condensed as described in Example 1 (II) with 13.7 g. of N-methylol-chloracetamide and the condensation product is then sulfonated at 25° with 6% of oleum. The dyestuff thus obtained has valuable properties similar to those described in Example 1.

Example 8

A mixture of 14.5 g. of the compound of formula

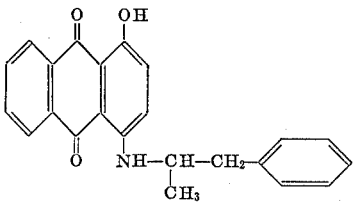

(obtained by reacting leuco-1,4-dihydroxy-anthraquinone with 1-phenyl-2-aminopropane), 20 g. of sec. butylamine, 40 g. of phenol and 9 g. of zinc dust is stirred for 18 hours in an autoclave at a temperature of 100°. The reaction mixture is transferred into a stirring flask, 300 ml. of ethanol and 50 ml. of 30% sodium hydroxide solution are added and the whole is stirred under reflux while simultaneously introducing a stream of air until no more leuco compounds can be detected. The precipitate obtained is filtered off, washed with methanol and then with water, and dried. By chromatography on an alumina column followed by recrystallization from butanol, the unsulfonated dyestuff of the formula

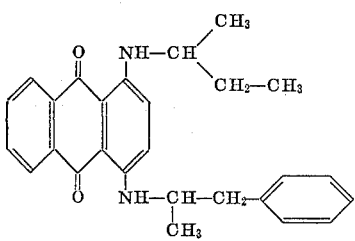

is obtained.

If, instead of the 1-hydroxy-anthraquinone compound of the first formula given above, an equivalent amount of the corresponding 1-amino-anthraquinone compound is used, then, with otherwise the same procedure, the anthraquinone compound of the above formula is also obtained.

41 g. of the unsulfonated dyestuff of the above formula are added to 90% sulfuric acid and condensed therein with 13.7 g. of N-methylol chloracetamide as described in Example 1 and then sulfonated in 6% of oleum at 25° for 15 hours. The monosulfonated dyestuff so obtained dyes nylon and wool from a weakly acid to neutral bath in brilliant blue shades. The dyeings have good wet and light fastness.

Example 9

A mixture of 37 g. of the compound of the formula

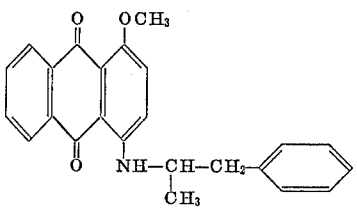

(obtained by methylating the corresponding 1-hydroxy-anthraquinone compound), 40 g. of sec. butylamine and 100 ml. of n-butanol is stirred for 24 hours in an autoclave at 150°. At a temperature of 60°, 100 ml. of methanol are slowly poured into the mixture whereupon a precipitate is formed. After cooling the reaction mixture, the precipitate is filtered off and recyrstallized from n-butanol. The product is identical with the unsulfonated dyestuff described in Example 8 and is further reacted as there described.

If in the above Example 9, instead of the 1-methoxy-anthraquinone compound of the above formula, an equivalent amount of the corresponding 1-nitro-anthraquinone compound obtained by reaction of 1-nitro-4-methoxy-anthraquinone with 1-phenyl-2-amino-propane is used and otherwise the procedure described in Example 9 is followed, then the same dyestuff is obtained.

Example 10

A mixture of 16 g. of 1,4-dihydroxy-anthraquinone, 8 g. of leuco-1,4-dihydroxy-anthraquinone, 16 g. of 1-phenyl-3-aminobutane and 50 ml. of sec. butanol is stirred for 18 hours at a temperature of 50 to 55°. Without isolating the corresponding 1-hydroxy-4-aralkylamino-anthraquinone so obtained, 25 g. of isopropylamine are added to the mixture and the whole is stirred in an autoclave for 20 hours at a temperature of 100°. The reaction mixture is transferred to a stirring flask, 250 ml. of methanol added thereto, and the mixture is stirred under reflux while simultaneously introducing a stream of air until no more leuco compound can be detected. After cooling, the precipitated reaction product is filtered off and washed with methanol after which it is recrystallized from n-butanol. This product is identical with the unsulfonated dyestuff of Example 2 and is further reacted as there described.

If the mixture first given above of 1,4-dihydroxy-anthraquinone and leuco-1,4-dihydroxy-anthraquinone is reacted in a first step with the isopropylamine and in a second step with 1-phenyl-3-aminobutane, then with otherwise analogous procedure, the same unsulfonated dyestuff is obtained.

Example 11

50 g. of the compound of the formula

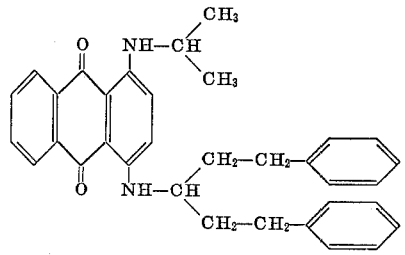

(obtained according to the process of Example 2 by condensation of 1-(N-acetyl-N-isopropylamino)-4-bromoanthraquinone with 1,5-diphenyl-3-aminopentane and then saponification of the acetal group) are mixed with 27.5 g. of N-methylol chloracetamide, the mixture is added to 500 g. of 90% sulphuric acid at a temperature of 5–10° and the whole is stirred for 24 hours. The condensation product is isolated as described in Example 1 and sulphonated in 6% oleum at 25° for 16 hours.

Example 12

10 g. of wool flannel are introduced into a 40° warm dyebath consisting of 400 ml. of water, 0.30 g. of ammonium sulphate and 0.20 g. of the dyestuff of the formula

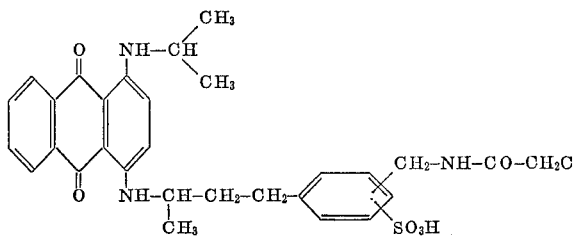

obtained according to Example 2. The temperature is gradually raised to the boil within 30 minutes whereupon dyeing is performed for 1 hour at the boil. The goods are then rinsed and finished in the usual way. A very level, brilliant blue dyeing is obtained which is distinguished by excellent fastness to light and wet fastness properties.

Example 13

10 g. of wool flannel are introduced at 40° into a dyebath consisting of 400 ml. of water, 0.20 g. of the dyestuff of Example 11, 0.60 g. of acetic acid and 0.20. g. of a dyeing auxiliary based on a coconut fatty acid dialkanolamide polyglycol ether. The temperature is gradually raised to a light boil within 30 minutes whereupon dyeing is performed for 1 hour at the boil. The dyed goods are then rinsed and dried. A level, brilliant blue dyeing is obtained which has very good wet and light fastness.

Example 14

10 g. of nylon 66 fabric are introduced into a 40° warm dye bath which contains 0.20 g. of the dyestuff according to Example 12, 0.25 g. of the sodium salt of the acid sulfuric acid ester of butyl ricinoleate and 0.25 g. of ammonium sulfate in 500 ml. of water. The temperature of the bath is raised gradually to the boil within 30 minutes whereupon dyeing is performed for 1 hour at a light boil. The goods are then rinsed and dried. A very level, brilliant blue dyeing is obtained which has very good fastness to light and good fastness to washing.

Example 15

100 g. of a fabric of texturized nylon 66 (Banlon type) is introduced at 40° into a dyebath containing in 4000 ml. of water 3 g. of the dyestuff of the formula

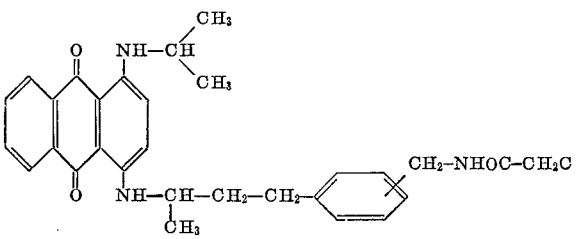

ground to an average particle size of about 2–5 microns, as well as 4 g. of oleic acid-N-methyl-tauride.

The temperature of the bath is raised evenly within about 30 minutes to the boil, and boiling is continued during another 60 minutes. The fabric is then thoroughly rinsed first in warm and then in cold water and dried. A brilliant blue dyeing of good fastness to water, to washing, to perspiration and to light is obtained.

We claim:

1. A dyestuff of the formula

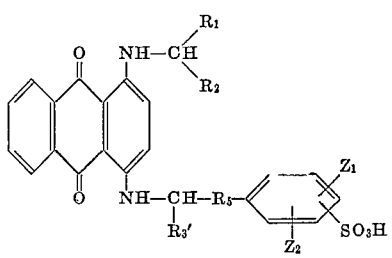

wherein each of $R_1$ and $R_2$ represents lower alkyl, $R_3'$ represents alkyl of from 1 to 2 carbon atoms, $R_5$ represents alkylene of from 1 to 2 carbon atoms, the sum of carbon atoms in $R_1$, $R_2$, $R_3'$ and $R_5$ ranging from five to eight, $Z_1$ represents hydrogen, methyl, methoxy, chlorine or bromine, and $Z_2$ represents hydrogen, methyl or methoxy.

2. A dyestuff as defined in claim 1, wherein each of $R_1$, $R_2$ and $R_3'$ is methyl, $R_5$ is —$CH_2$—$CH_2$—, and each of $Z_1$ and $Z_2$ represents hydrogen.

3. A dyestuff as defined in claim 1, wherein each of $R_1$ and $R_3'$ is methyl, $R_2$ is ethyl, $R_5$ is —$CH_2$— and each of $Z_1$ and $Z_2$ is hydrogen.

References Cited

UNITED STATES PATENTS 2,426,547 8/1947 Buckley et al. __ 260—371 XR
2,475,530 7/1949 Tatum _____ 260—371

LORRAINE A. WEINBERGER, *Primary Examiner.*

H. C. WEGNER, *Assistant Examiner.*

U.S. Cl. X.R.

260—268, 294.8, 295, 296, 372, 376, 377, 378, 381; 8—27, 39